(12) United States Patent
Hardison et al.

(10) Patent No.: US 8,853,978 B2
(45) Date of Patent: Oct. 7, 2014

(54) ELECTRIC MOTOR DRIVE SYSTEM CAPTURE AND CONTROL APPARATUS FOR ENERGY SAVINGS

(71) Applicants: Steven Ross Hardison, Murray, UT (US); Totada R Shantha, Stone Mountain, GA (US)

(72) Inventors: Steven Ross Hardison, Murray, UT (US); Totada R Shantha, Stone Mountain, GA (US)

( * ) Notice: Subject to any disclaimer, the term of this patent is extended or adjusted under 35 U.S.C. 154(b) by 0 days.

(21) Appl. No.: 14/197,582

(22) Filed: Mar. 5, 2014

(65) Prior Publication Data

US 2014/0184111 A1    Jul. 3, 2014

Related U.S. Application Data

(60) Provisional application No. 61/832,392, filed on Jun. 7, 2013.

(51) Int. Cl.
*H02P 1/00* (2006.01)
*H02P 7/00* (2006.01)
*B60L 11/18* (2006.01)

(52) U.S. Cl.
CPC ............... *H02P 7/00* (2013.01); *B60L 11/1805* (2013.01)
USPC .......................... 318/294; 318/372; 318/373

(58) Field of Classification Search
USPC ......... 318/294, 312, 373, 463, 798, 803, 811, 318/507, 510
See application file for complete search history.

(56) References Cited

U.S. PATENT DOCUMENTS 4,581,565 A * 4/1986 Van Pelt et al. ............... 318/294

* cited by examiner

*Primary Examiner* — Karen Masih
(74) *Attorney, Agent, or Firm* — Mark David Torche; Patwrite LLC

(57) ABSTRACT

An electric motor drive system capture and control apparatus for energy savings has an alternating current power source electrically connected to a direct current motor. A power rectifier diode rated for the alternating current power source and the direct current motor is electrically connected in a reverse bias mode between the negative supply wire of the direct current motor and a grounded neutral conductor of the alternating current power source. A ground wire is electrically connected to the direct current motor and cross connected to a hot lag wire of the alternating current power source. The direct current motor is voltage matched to the alternating current power source. A transformer is electrically connected to the alternating current power source and the direct current motor. The system may be scaled to work with a power grid or for use in a vehicle.

8 Claims, 20 Drawing Sheets

System 1 Grid Polarity 1 Hertz 1
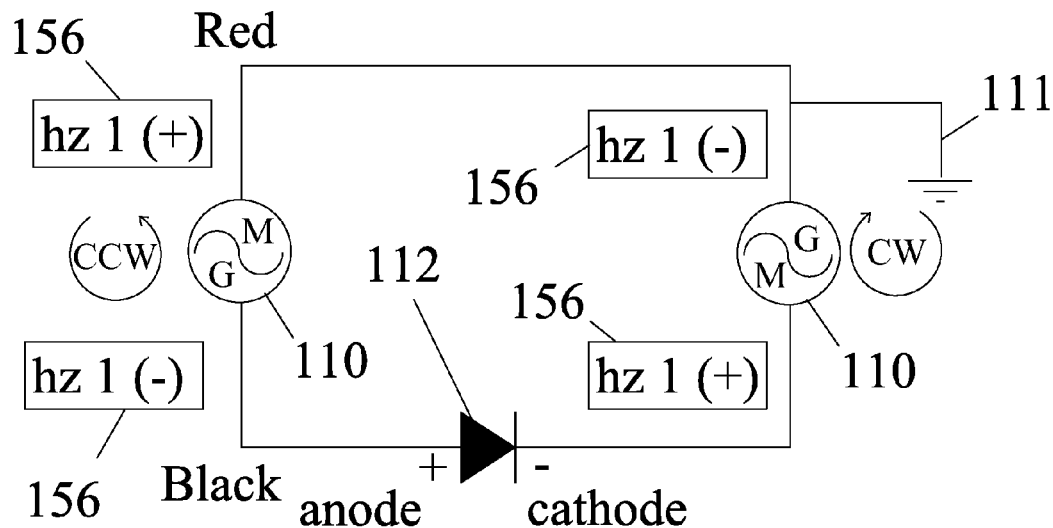
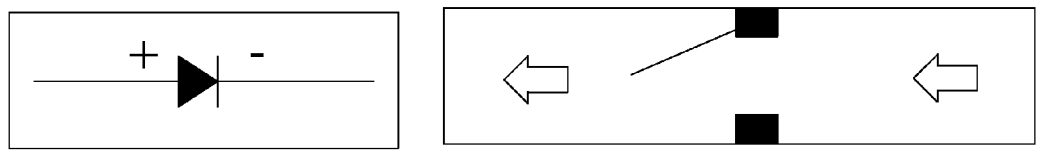
Forward biased diode
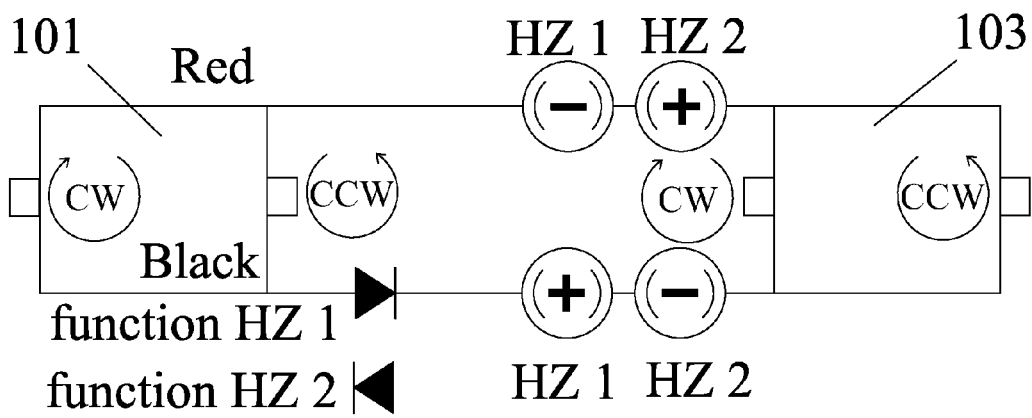
FIG. 2A(1)

System 2 Grid Polarity 1 Hertz 1
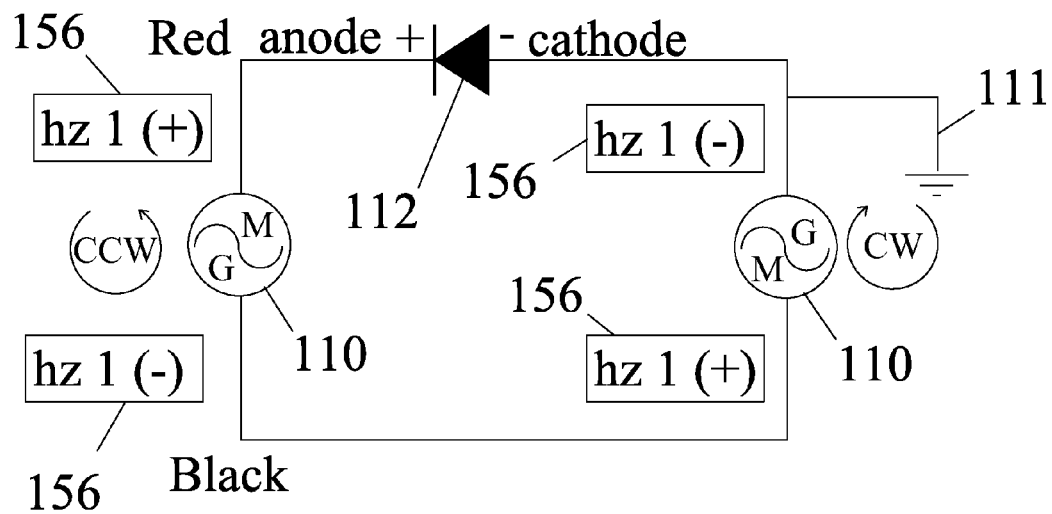
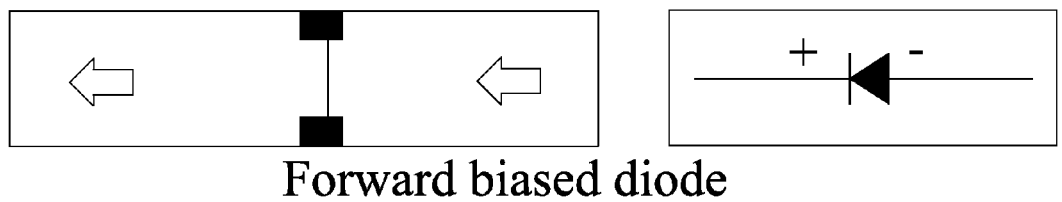
Forward biased diode
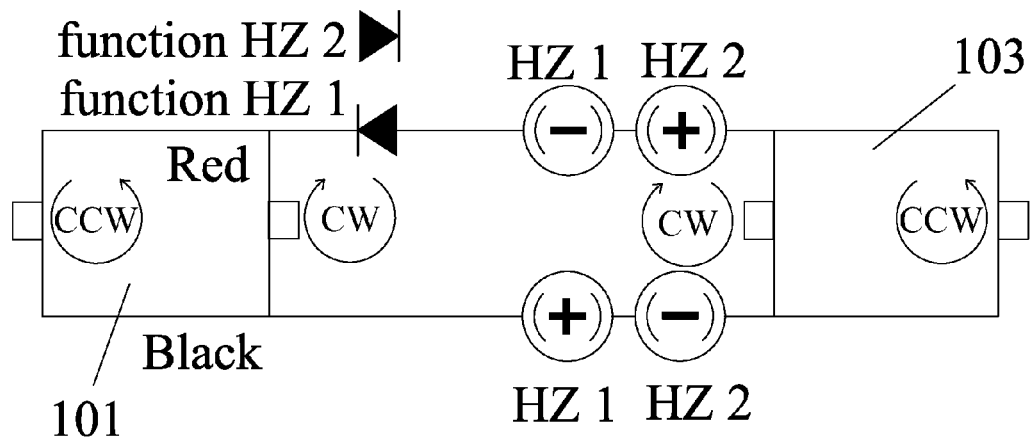
FIG. 2A(2)

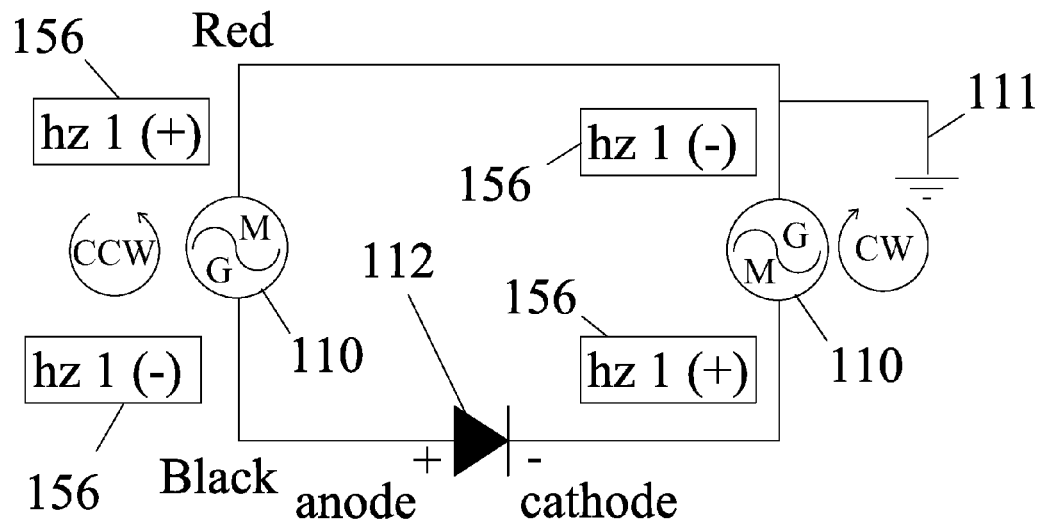
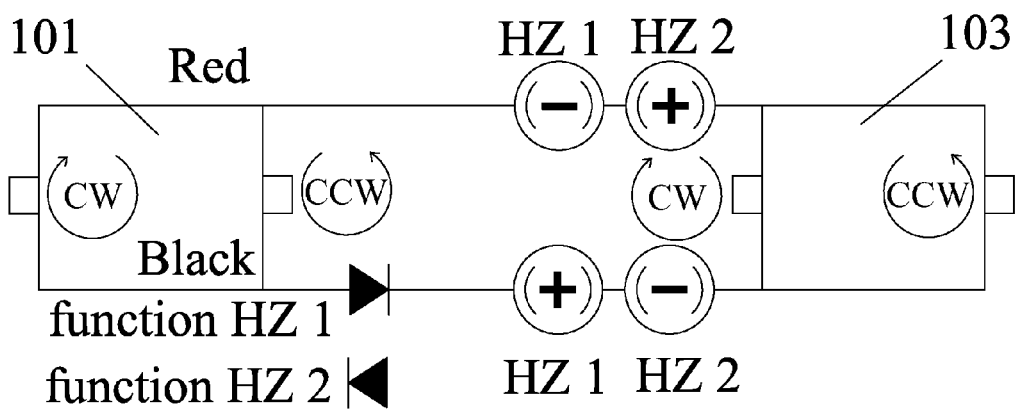
FIG. 2B(1)

System 2 Grid Polarity 2 Hertz 2
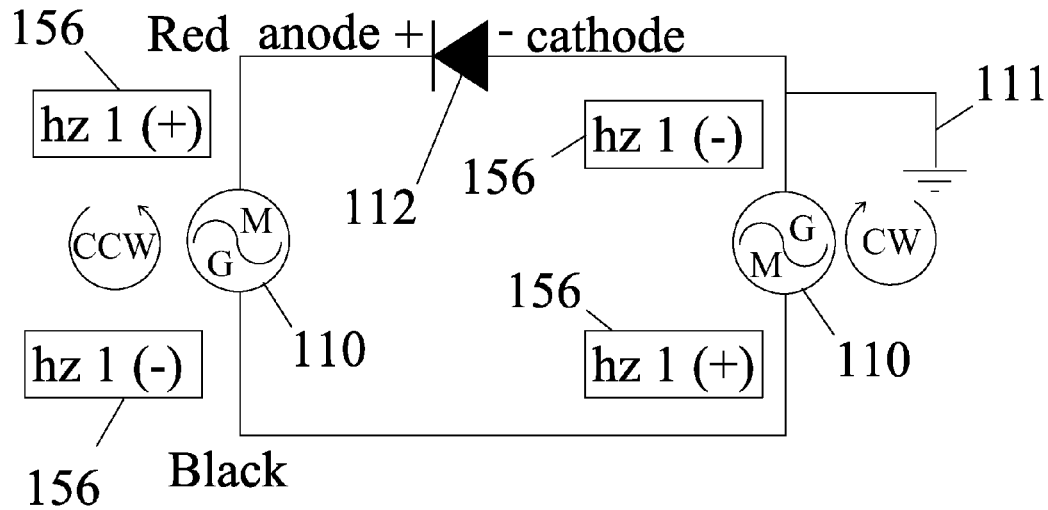
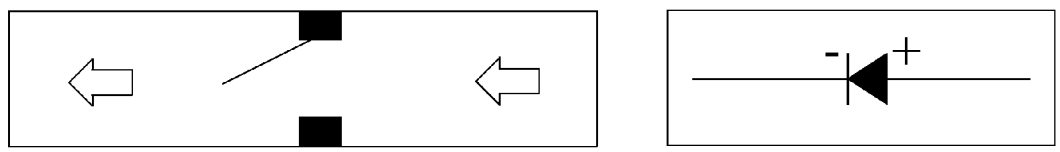
Forward biased diode
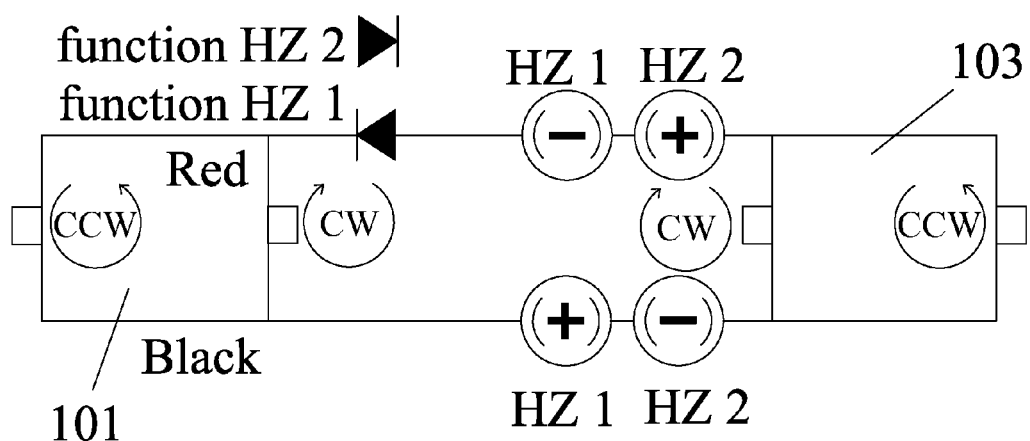
FIG. 2B(2)

ELECTRIC MOTOR DRIVE SYSTEM CAPTURE AND CONTROL APPARATUS FOR ENERGY SAVINGS

CROSS REFERENCE TO RELATED APPLICATIONS

This application claims priority and herein incorporates by reference U.S. provisional patent application 61/832,392, filed Jun. 7, 2013.

BACKGROUND OF THE INVENTION

Of all the advances that are the hallmark of our modern society, almost all are based on the ability to transform energy to do useful work. Historically, this is often referred to as the industrial revolution. It has long been demonstrated that energy is not created or destroyed in a closed system so efficiency and recovery of energy that is not normally available to do work is important.

There is a need for an invention that greatly increases efficiency and energy recovery of electric motor/generator systems.

SUMMARY OF THE INVENTION

An electric motor drive system capture and control apparatus for energy savings has an alternating current power source electrically connected to a direct current motor. A power rectifier diode rated for the alternating current power source and the direct current motor is electrically connected in a reverse bias mode between the negative supply wire of the direct current motor and a grounded neutral conductor of the alternating current power source. A ground wire is electrically connected to the direct current motor and cross connected to a hot lag wire of the alternating current power source. The direct current motor is voltage matched to the alternating current power source. A transformer is electrically connected to the alternating current power source and the direct current motor. The system may be scaled to work with a power grid or for use in a vehicle.

The electric motor drive system capture and control apparatus for energy savings consists of new electronic and electrical Pulse Gate controlled system architectures of various sizes, power and horsepower ratings, which utilize the bidirectional leading electromotive forces that are exerted on the bidirectional lagging electromotive forces in electrical systems that are associated with the bipolar flows of electric current field energy within alternating current electrical systems, that are connected as generally illustrated in the attached drawings to the electrical supply wiring of direct current electric motors connected to alternating current power sources as confirmed by the attached drawings, explanations and 3rd party power quality test reports.

Electric power saving, electric power consumption neutralizing and electricity generating AC/DC auto energy harvesting motor drive system architectures for DC motors connected to alternating-current power sources consist of direct current electric motors, power rectifier diode(s) rated for the electric power they are intended to be used for, transformer(s) rated for the electric power they are intended to be used for, and the unique new electric wiring logic and components also all rated for the electric power they are intended to be used for. All combine in specific new system architectures to enable the Pulse Gate electric power saving, electric power consumption neutralizing, electricity generating and auto energy harvesting effect to occur, when all of these system components are used specifically in concert with each other as explained in the attached drawings and disclosure.

The single phase embodiment of the instant invention using permanent magnet, direct current electric motors permanent magnet direct current electric motors retrofitted with rectifier diode rated for the electric power involved, connected to the motor supply wiring in a reverse bias orientation relative to the stator magnet field polarity, connected between the negative supply wire of the DC motor and the grounded neutral conductor of the alternating current electric power source, the ground wire of the DC motor is also cross connected to the hot lag of the AC power source. The motor must be voltage matched to the AC power source by factory design or by correcting any voltage incompatibilities by using electric transformers rated for the power (amp draw and voltages) involved as described with respect to the attached drawings.

The single phase embodiment of the technology for shunt, compound, series or other wound DC motors consists of the same components listed above with the exception of an additional power rated transformer where necessary, a bridge rectifier, and wiring as described with reference to the attached drawings.

The three phase embodiment of this technology for shunt, compound, series or other wound DC motors consists of the same components listed above with the exception of two additional mirror copies of the materials listed above which may be used in order to interface the three phase embodiment of this technology with a three phase alternating current electric power source as described with reference to the attached drawings The power consumption neutralization effects consist of the bidirectional leading electromotive forces that are exerted on the bidirectional lagging electromotive forces in electrical systems that are associated with the bipolar flows of electric current field energy in alternating current electrical systems that are connected per the attached drawings to the electrical supply wiring of direct current electric motors connected to alternating current power sources as confirmed by the attached drawings, explanations, and phasor diagram test results.

Power consumption neutralization control systems for DC motors connected to alternating-current power sources consist of direct current electric motors, a power rectifier diode(s) rated for the electric power they are intended to be used for, transformer(s) rated for the electric power they are intended to be used for, and the unique new electric wiring logic also rated for the electric power intended to be used for, all combined in a specific new architecture to enable the power consumption neutralization effect to occur, when used in concert with each other per the attached drawings.

The single phase embodiment of the tech knowledge for permanent magnet, direct current electric motors permanent magnet direct current electric motors retrofitted with rectifier diode(s) rated for the electric power involved, connected to the motor supply wiring in a reverse bias orientation relative to the stator magnet field polarity, connected between the negative supply wire of the DC motor and the grounded neutral conductor of the alternating current electric power source, the ground wire of the DC motor is also cross connected to the hot lag of the AC power source. The motor must be voltage matched to the AC power source by design or by a power rated electric transformer that is rated for the amp draws involved as illustrated per the attached drawings.

The single phase embodiment of the technology for shunt, compound, series or other wound DC motors consists of the same components listed above with the exception of an additional power rated transformer where necessary, a bridge rectifier, and wiring will be required per the attached drawings.

The three phase embodiment of the technology for shunt, compound, series, or other wound DC motors consists of the same components listed above with the exception of two additional mirror copies of the materials listed above can be used in order to interface the three phase embodiment of this technology in a load balanced manner with a three phase alternating current electric power source as illustrated per attached drawings.

Definitions, Terms and Background Information

P-N Diodes

Normal (p-n) diodes, which operate as described above, are usually made of doped silicon or, more rarely, germanium. Before the development of silicon power rectifier diodes, cuprous oxide and later selenium was used; its low efficiency gave it a much higher forward voltage drop (typically 1.4 to 1.7 V per "cell", with multiple cells stacked to increase the peak inverse voltage rating in high voltage rectifiers), and required a large heat sink (often an extension of the diode's metal substrate), much larger than a silicon diode of the same current ratings would require. The vast majority of all diodes are the p-n diodes found in CMOS integrated circuits, which include two diodes per pin and many other internal diodes.

Avalanche Diodes

Diodes that conduct in the reverse direction when the reverse bias voltage exceeds the breakdown voltage. These are electrically very similar to Zener diodes, and are often mistakenly called Zener diodes, but break down by a different mechanism, the avalanche effect. This occurs when the reverse electric field across the p-n junction causes a wave of ionization, reminiscent of an avalanche, leading to a large current. Avalanche diodes are designed to break down at a well-defined reverse voltage without being destroyed. The difference between the avalanche diode (which has a reverse breakdown above about 6.2 V) and the Zener is that the channel length of the former exceeds the mean free path of the electrons, so there are collisions between them on the way out. The only practical difference is that the two types have temperature coefficients of opposite polarities.

Cat's Whisker or Crystal Diodes

These are a type of point-contact diode. The cat's whisker diode consists of a thin or sharpened metal wire pressed against a semiconducting crystal, typically galena or a piece of coal. The wire forms the anode and the crystal forms the cathode. Cat's whisker diodes were also called crystal diodes and found application in crystal radio receivers. Cat's whisker diodes are generally obsolete, but may be available from a few manufacturers. Additionally, plans are available on the Internet that allow a user to build their own cat whisker diode.

Constant Current Diodes

These are actually a JFET with the gate shorted to the source, and function like a two-terminal current-limiter analog to the Zener diode, which is limiting voltage. They allow a current through them to rise to a certain value, and then level off at a specific value. Also called CLDs, constant-current diodes, diode-connected transistors, or current-regulating diodes.

Esaki or Tunnel Diodes

These have a region of operation showing negative resistance caused by quantum tunneling, allowing amplification of signals and very simple bistable circuits. Due to the high carrier concentration, tunnel diodes are very fast, may be used at low (mK) temperatures, high magnetic fields, and in high radiation environments. Because of these properties, they are often used in spacecraft.

Gunn Diodes

These are similar to tunnel diodes in that they are made of materials such as GaAs or InP that exhibit a region of negative differential resistance. With appropriate biasing, dipole domains form and travel across the diode, allowing high frequency microwave oscillators to be built.

Thermal Diodes

This term is used both for conventional p-n diodes used to monitor temperature due to their varying forward voltage with temperature, and for Peltier heat pumps for thermoelectric heating and cooling. Peltier heat pumps may be made from semiconductor, though they do not have any rectifying junctions, they use the differing behavior of charge carriers in N and P type semiconductor to move heat.

Photodiodes

All semiconductors are subject to optical charge carrier generation. This is typically an undesired effect, so most semiconductors are packaged in light blocking material. Photodiodes are intended to sense light (photodetector), so they are packaged in materials that allow light to pass, and are usually PIN (the kind of diode most sensitive to light). A photodiode can be used in solar cells, in photometry, or in optical communications. Multiple photodiodes may be packaged in a single device, either as a linear array or as a two-dimensional array. These arrays should not be confused with charge-coupled devices.

Pin Diodes

A PIN diode has a central un-doped, or intrinsic, layer, forming a p-type/intrinsic/n-type structure. They are used as radio frequency switches and attenuators. They are also used as large volume ionizing radiation detectors and as photodetectors. PIN diodes are also used in power electronics, as their central layer can withstand high voltages. Furthermore, the PIN structure can be found in many power semiconductor devices, such as IGBTs, power MOSFETs, and thyristors.

Schottky Diodes

Schottky diodes are constructed from a metal to semiconductor contact. They have a lower forward voltage drop than p-n junction diodes. Their forward voltage drop at forward currents of about 1 mA is in the range 0.15 V to 0.45 V, which makes them useful in voltage clamping applications and prevention of transistor saturation. They can also be used as low loss rectifiers, although their reverse leakage current is in general higher than that of other diodes. Schottky diodes are majority carrier devices and so do not suffer from minority carrier storage problems that slow down many other diodes—so they have a faster reverse recovery than p-n junction diodes. They also tend to have much lower junction capacitance than p-n diodes, which provides for high switching speeds and their use in high-speed circuitry and RF devices such as switched-mode power supply, mixers, and detectors.

Super Barrier Diodes

Super barrier diodes are rectifier diodes that incorporate the low forward voltage drop of the Schottky diode with the surge-handling capability and low reverse leakage current of a normal p-n junction diode.

Gold-Doped Diodes

As a dopant, gold (or platinum) acts as recombination centers, which helps a fast recombination of minority carriers. This allows the diode to operate at signal frequencies, at the expense of a higher forward voltage drop. Gold-doped diodes are faster than other p-n diodes (but not as fast as Schottky diodes). They also have less reverse-current leakage than Schottky diodes (but not as good as other p-n diodes). A typical example is the 1N914 diode.

Snap-Off or Step Recovery Diodes

The term step recovery relates to the form of the reverse recovery characteristic of these devices. After a forward current has been passing in an SRD and the current is interrupted or reversed, the reverse conduction will cease very abruptly (as in a step waveform). SRDs can, therefore, provide very fast voltage transitions by the very sudden disappearance of the charge carriers.

Stabistors or Forward Reference Diodes

The term stabistor refers to a special type of diodes featuring extremely stable forward voltage characteristics. These devices are specially designed for low-voltage stabilization applications requiring a guaranteed voltage over a wide current range and highly stable over temperature.

Transient Voltage Suppression Diode (TVS)

These are avalanche diodes designed specifically to protect other semiconductor devices from high-voltage transients. Their p-n junctions have a much larger cross-sectional area than those of a normal diode, allowing them to conduct large currents to ground without sustaining damage.

Varicap or Varactor Diodes

These are used as voltage-controlled capacitors. These are important in PLL (phase-locked loop) and FLL (frequency-locked loop) circuits, allowing tuning circuits, such as those in television receivers, to lock quickly. They also enabled tunable oscillators in early discrete tuning of radios, where a cheap and stable, but fixed-frequency, crystal oscillator provided the reference frequency for a voltage-controlled oscillator.

Zener Diodes

Diodes that can be made to conduct backward, correctly termed reverse breakdown diodes. This effect, called Zener breakdown, occurs at a precisely defined voltage, allowing the diode to be used as a precision voltage reference. The term Zener diode is colloquially applied to several types of breakdown diodes, but strictly speaking Zener diodes have a breakdown voltage of below 5 volts, whilst those above that value are usually avalanche diodes. In practical voltage reference circuits, Zener and switching diodes are connected in series and opposite directions to balance the temperature coefficient to near-zero. Some devices labeled as high-voltage Zener diodes are actually avalanche diodes (see above). Two (equivalent) Zeners in series and in reverse order, in the same package, constitute a transient absorber (TRANSZORB® for example).

The Zener diode is named for Dr. Clarence Melvin Zener of Carnegie Mellon University, inventor of the device. Other uses for semiconductor diodes include sensing temperature, and computing analog logarithms.

Thermionic (Vacuum Tube) Diodes and Solid State (Semiconductor) Diodes

Thermionic (vacuum tube) diodes and solid state (semiconductor) diodes were developed separately, at approximately the same time, in the early 1900s, as radio receiver detectors. Until the 1950s vacuum tube diodes were more often used in radios because the early point-contact type semiconductor diodes (cat's-whisker detectors) were less stable, and because most receiving sets had vacuum tubes for amplification that could easily have diodes included in the tube (for example the 12SQ7 double-diode triode), and vacuum tube rectifiers and gas-filled rectifiers handled some high voltage/high current rectification tasks beyond the capabilities of semiconductor diodes (such as selenium rectifiers) available at the time.

Vacuum Tube Diodes

In 1873, Frederick Guthrie discovered the basic principle of operation of thermionic diodes. Guthrie discovered that a positively charged electroscope could be discharged by bringing a grounded piece of white-hot metal close to it (but not actually touching it). The same did not apply to a negatively charged electroscope, indicating that the current flow was only possible in one direction.

Thomas Edison independently rediscovered the principle on Feb. 13, 1880. At the time, Edison was investigating why the filaments of his carbon-filament light bulbs nearly always burned out at the positive connected end. He had a special bulb made with a metal plate sealed into the glass envelope. Using this device, he confirmed that an invisible current flowed from the glowing filament through the vacuum to the metal plate, but only when the plate was connected to the positive supply. Edison devised a circuit where his modified light bulb effectively replaced the resistor in a DC voltmeter. Edison was awarded a patent for this invention in 1884. Since there was no apparent practical use for such a device at the time, the patent application was most likely simply a precaution in case someone else did find a use for the so-called Edison effect.

About 20 years later, John Ambrose Fleming (scientific adviser to the Marconi Company and former Edison employee) realized that the Edison effect could be used as a precision radio detector. Fleming patented the first true thermionic diode, the Fleming valve, in Britain on Nov. 16, 1904 (followed by U.S. Pat. No. 803,684 in November 1905).

Solid-State Diodes

In 1874 German scientist Karl Ferdinand Braun discovered the "unilateral conduction" of crystals. Braun patented the crystal rectifier in 1899. Copper oxide and selenium rectifiers were developed for power applications in the 1930s.

Indian scientist Jagadish Chandra Bose was the first to use a crystal for detecting radio waves in 1894. The crystal detector was developed into a practical device for wireless telegraphy by Greenleaf Whittier Pickard, who invented a silicon crystal detector in 1903 and received a patent for it on Nov. 20, 1906. Other experimenters tried a variety of other substances, of which the most widely used was the mineral galena (lead sulfide). Other substances offered slightly better performance, but galena was most widely used because it had the advantage of being cheap and easy to obtain. The crystal detector in these early crystal radio sets consisted of an adjustable wire point-contact (the so-called "cat's whisker"), which could be manually moved over the face of the crystal in order to obtain optimum signal.

This troublesome device was superseded by thermionic diodes by the 1920s, but after high purity semiconductor materials became available, the crystal detector returned to dominant use with the advent of inexpensive fixed-germanium diodes in the 1950s. Bell Labs also developed a germanium diode for microwave reception, and AT&T used these in their microwave towers that crisscrossed the nation starting in the late 1940s, carrying telephone and network television signals. Bell Labs did not develop a satisfactory thermionic diode for microwave reception.

Rectifiers

Power supply (half-wave or full-wave or bridge) rectifiers CRT (especially TV) Extra-high voltage flyback, "damper" or "booster" diodes such as the 6AU4GTA tube rectifier.

Thermionic Diodes

Diode vacuum tube construction typically includes an anode and a cathode heated by a filament sealed in an evacuated glass envelope. Early examples were fairly similar in appearance to incandescent light bulbs. In operation, a separate current through the filament (heater), a high resistance wire made of nichrome, heats the cathode red hot (800-1000° C.), causing it to release electrons into the vacuum, a process called thermionic emission. The cathode is coated with oxides of alkaline earth metals such as barium and strontium oxides, which have a low work function, to increase the number of electrons emitted. (Some valves use direct heating, in which a tungsten filament acts as both heater and cathode.) The alternating voltage to be rectified is applied between the cathode and the concentric plate electrode. When the plate has a positive voltage with respect to the cathode, it electrostatically attracts the electrons from the cathode, so a current of electrons flows through the tube from cathode to plate. However when the polarity is reversed and the plate has a negative voltage, no current flows, because the cathode electrons are not attracted to it. The unheated plate does not emit any electrons itself, so current can only flow through the tube in one direction, from cathode to plate.

In a mercury-arc valve, an arc forms between a refractory conductive anode and a pool of liquid mercury acting as cathode. Such units were made with ratings up to hundreds of kilowatts, and were important in the development of HVDC power transmission. Some types of smaller thermionic rectifiers sometimes had mercury vapor fill to reduce their forward voltage drop and to increase current rating over thermionic hard-vacuum devices.

Throughout the vacuum tube era, valve diodes were used in analog signal applications and as rectifiers in DC power supplies in consumer electronics such as radios, televisions, and sound systems. They were replaced in power supplies beginning in the 1940s by selenium rectifiers and then by semiconductor diodes by the 1960s.

Today they are still used in a few high power applications where their ability to withstand transients and their robustness gives them an advantage over semiconductor devices. The recent (2012) resurgence of interest among audiophiles and recording studios in old valve audio gear such as guitar amplifiers and home audio systems has provided a market for the legacy consumer diode valves.

Other features and advantages of the instant invention will become apparent from the following description of the invention which refers to the accompanying drawings.

BRIEF DESCRIPTION OF THE DRAWINGS

FIG. 2A(1) is a circuit diagram of the system 1 grid polarity 1 Hertz 1 156 of the electric power saving, electric power consumption neutralizing, and electricity generating AC/DC pulse action electric motor drive system architectures.

FIG. 2A(2) is a circuit diagram of the system 2 grid polarity 1 hertz 1 of electric power saving, electric power consumption neutralizing, and electricity generating AC/DC pulse action electric motor drive system architectures.

FIG. 2B(1) is a circuit diagram of the system 1 grid polarity 2 hertz 2 of the electric power saving, electric power consumption neutralizing, and electricity generating AC/DC pulse action electric motor drive system architectures.

FIG. 2B(2) is a circuit diagram of the system 2 grid polarity 2 hertz 2 of electric power saving, electric power consumption neutralizing, and electricity generating AC/DC pulse action electric motor drive system architectures.

DESCRIPTION OF THE INVENTION

Figure 1:
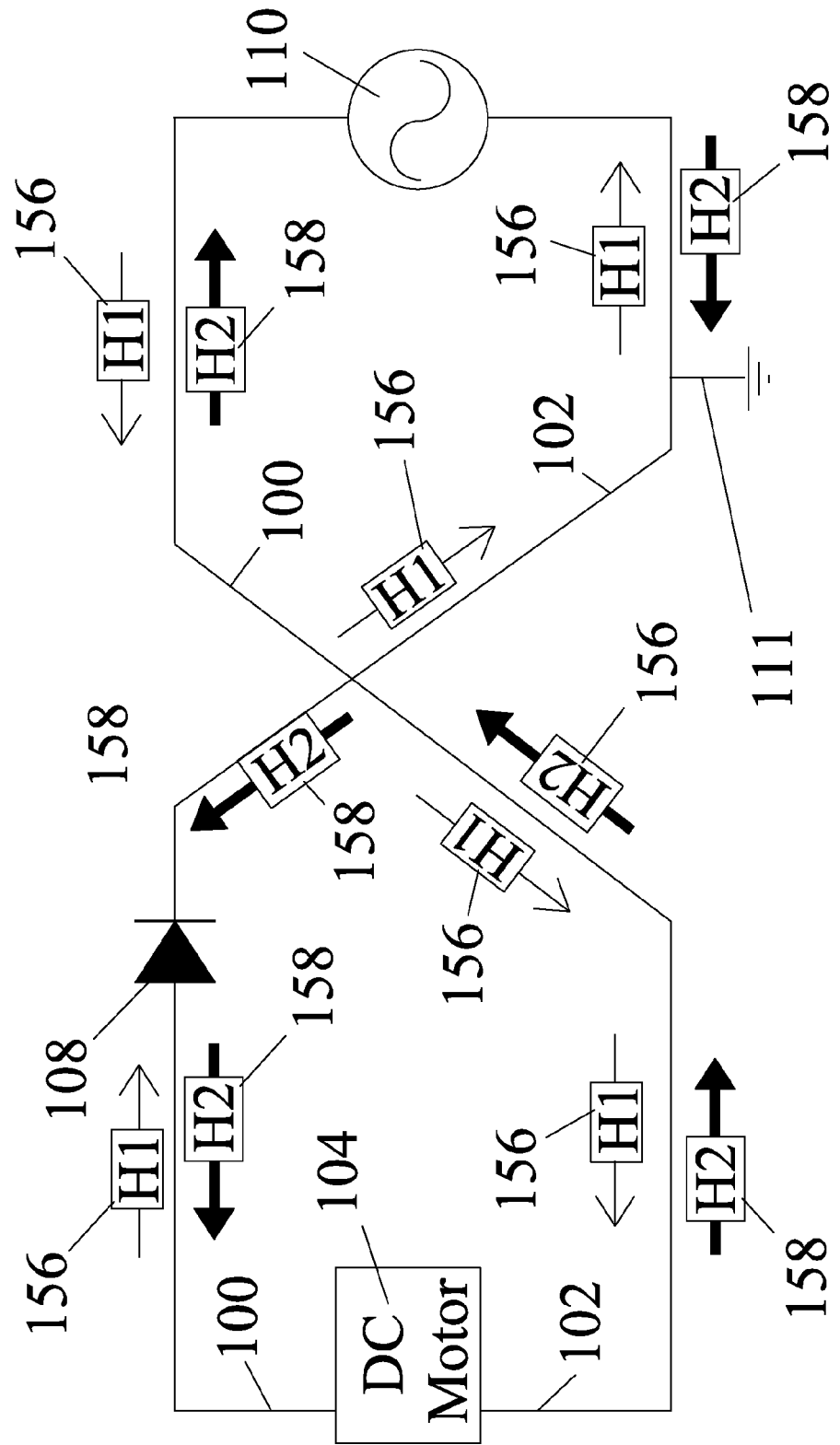
FIG. 1 is a circuit diagram of the electric power consumption neutralization, electric power generation and electric power backfeed effect illustrating how the pulse gate electric power saving, electric power consumption neutralizing, electricity generating and auto energy harvesting effect is achieved according to an embodiment of the present invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

The invention consists of several new classes of energy saving, electricity generating and electric power consumption neutralizing auto energy harvesting AC/DC electric motor control systems that convert otherwise electric power consuming direct-current motor control systems into electricity generating, synchronous AC/DC electric motor control systems that are powered by the recovered otherwise unwanted counterproductive magnetic component of the electricity of the Grid. The scope of this invention also includes the capture, control and energy utilization architectures required to monetize the electricity that is multi-directionally cogenerated (produced) by these systems.

The subject matter of this invention is the application of pulse gate electric power saving, electric power consumption neutralizing and auto energy harvesting effect as it relates to common DC motors connected to AC power sources in unique new ways and the development of the four AC/DC electric motor control systems that comprise the embodiments of this effect, that enable the benefits of this effect to be fully realized.

The four applicable embodiments are:
1. Power consumption neutralization control systems for DC motors connected to alternating-current electric power sources.
2. A single-phase embodiment of the technology for PMDC electric motors.
3. A single-phase embodiment of the technology for shunt, compound, series or other wound DC motors.
4. A three-phase embodiment of the technology for shunt, compound, series or other wound DC motors, the organizational structure, processes of assembly, electrical functions, methods of manufacture, material compositions, and the features and benefits of this effect.

Of course all of these embodiments may be modified to apply generally to nearly all energy use situations.

The electric power saving, electric power consumption neutralizing and electricity generating AC/DC pulse action electric motor drive systems including the capture, and control apparatus to automatically harvest and monetize the usable power and energy saved and produced by these systems for direct-current electric motors connected to alternating-current power sources are electrical processes that enable DC motors to generate enough electricity, while rotating either counter clock-wise or clock-wise relative to the drive end of the motor, and while synchronously connected to an alternating current-power source, to almost completely offset their own electric power consumption.

This effect is accomplished electromechanically by a simple cross connection of the power supply wires of a DC motor to an AC power source; and by the insertion of a power rated rectifier diode, in forward or reverse bias depending on the relative orientation of the diode bias to the relative magnetic polarities of DC motors, interfaced between the positive or negative wire of the DC motor and the grounded neutral conductor of an alternating-current power source, for the purposes of saving as much electric power as possible, neutralizing as much of the bi-directional reverse motive (counterproductive force within our electricity as possible and for co-generating as much usable alternating-current electricity as possible all of which interact with components of the electricity we all use, that traditionally has constituted electric power consumption and the prices we all must pay for it, by applying opposing timed bi-directional forward motive forces as a counter acting forces to the electrical forces, that is normally constitute electric power consumption and which traditionally exert counterproductive electromagnetic forces on the electric current flows delivered and received during the delivery and transmission or alternating-current electricity in electrical systems. These systems recover and enable DC motors to operate on this normally counterproductive dirty power and are capable of returning usable cleaner power to the grid as they operate. Essentially this system cleans up the electric power of the grid.

The new electric power saving, electric power consumption neutralizing, and electricity generating auto recovery and energy harvesting systems for direct-current electric motors connected to alternating-current electric power sources are illustrated in the attached drawings and associated numeral references. These motors normally produce between 60% to 94% and in some cases even more of their own electricity and horsepower. As the mechanical load of these motors increases, the motors produce a proportionally larger negative amp draw, which neutralizes the conventional load directed amp draw that normally constitutes electric power consumption and embodiments of these systems are capable of driving pumps, compressors, generators and other mechanical loads.

Referring to FIG. 1, a general circuit diagram of one of the fundamental embodiments of the present invention is shown illustrating how the pulse gate electric power saving, electric power consumption neutralizing, electricity generating and auto energy harvesting effect is achieved. A positive red wire 100 is shown in electrical contact with an alternating current power source and electric power load 110 and a diode 108 and a negative black wire 102. A ground 111 is provided to establish ground potential. A forward biased current H1 156 is shown and a reverse biased current H2 158 flows through circuit as indicated.

Referring to FIGS. 1, 2A(1), 2A(2), 2B(1) and 2B(2), the electric power saving, electric power consumption neutralizing, and electric power generation and auto energy harvesting effect is shown with positive red wire 100 connected to a permanent magnet direct current (PMDC) motor 104 and negative black wire 102 also connected to PMDC motor 104. Forward biased current H1 156 is shown as well as the reverse biased current H2 158 blocked and passed respectively by diode 108. Alternating current electric power source and electric power load 110 is shown connected to the instant circuit. Ground 111 is provided to ground the circuit. An AC power source and AC electric load power is labeled as 114 in the Hertz 1 diagram where diode 108 is forward biased with respect to H1 156 and as H2 158 where diode 108 is reverse biased with respect to H2 158.

Figure 3:
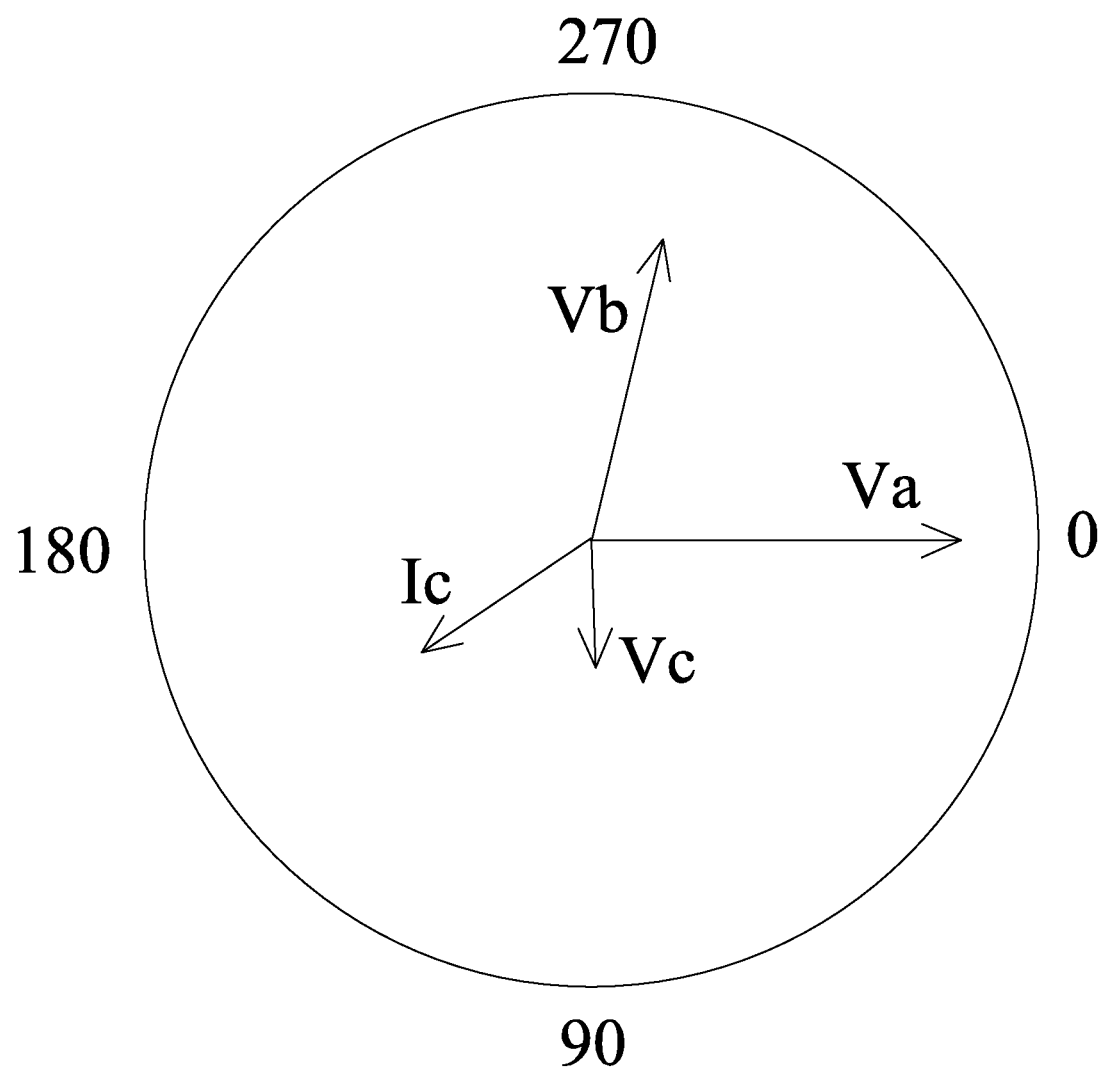
FIG. 3 is a phasor diagram of the prior art showing the electric power consumption amp draw phasor arrow of a DC motor running in a clockwise electric power consumption mode as a basis of comparison.

Referring now to the data contained in FIGS. 3 (prior art) and 4, electric power consumption and electric power generation phasor diagrams of DC motors running in various electric power consumption modes and of DC motors running in various highly reduced electric power consumption modes are shown as bases of comparison with each other. The FIG. 3 phasor diagram shows one of the early phasor measurements of the traditional electric power consumption of a 30 HP motor we tested under load running in electric power consumption mode without the instant invention's power electronics applied and included to use as a preliminary basis of comparison only.

Figure 4:
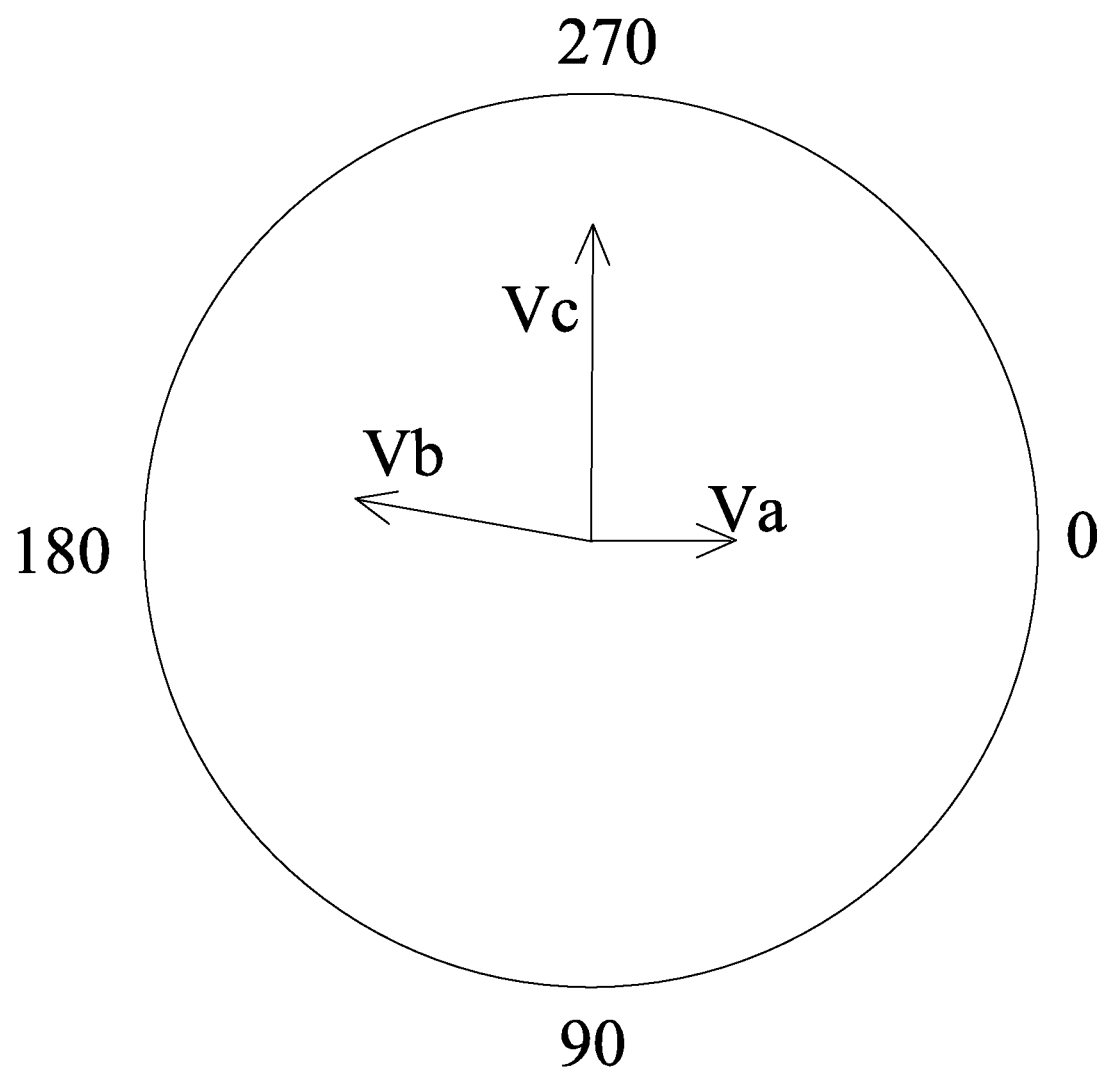
FIG. 4 is a phasor diagram of the power savings according to an embodiment of the present invention.

FIG. 4 includes third party phasor diagrams and power quality analysis reports that show the phasor measurements of some of our more recent testing and the other preliminary comparable phasor for the same 30 HP motor operating under the same load as tested in FIG. 3 only with the instant invention's power electronics applied operating in electric power saving, electric power consumption neutralization, electric power generation and electric charge back feed mode.

When you closely compare the Vb power consumption measurement of this FIG. 3 phasor measurement with the FIG. 4 Vb electric power consumption neutralized (electric power generation) phasor measurement our applied power electronics generate, you will notice that the Vb of FIG. 4 shifts approximately 90 degrees in the leading direction as compared to Vb in FIG. 3. And its amplitude compresses indicating electric power generation. Vc of FIG. 3 as compared to Vc of FIG. 4 shifts approx. 180 degrees leading and nearly doubles in amplitude as compared to FIG. 3. The current Ic of FIG. 3 compared to Ic of FIG. 4 also shifts from +120 amps to zero traditional lagging amp draw.

All disharmonics monitoring was done using GE Meter Mate software and GE KVA diagnostic power and energy meter and no malharmonics were detected outside of the norms for acceptable disharmonic levels. Our long term run tests for thermal build up were also found to be within the name plate ratings for motors of the size and horsepower we tested.

Third party testing was also performed using state of the art Yokogawa digital power quality analysis equipment. All of which indicates that our systems are contributory to considerable electric power savings by electric power consumption reduction, considerable electric power production, and directs considerable electrical capacitance (traditional potential energy) synchronously back toward the grid unidirectionally only on the phase line(s) of the power supply of these systems, most of which normally neutralizes the traditional counter flowing oppositely charged (counterproductive motive forces of the grid), when these electrical systems are properly configured per our specifications, properly sized by electrical engineering professionals to handle the electrical loads involved, and are installed by licensed professional electrical contractors.

Figure 5:
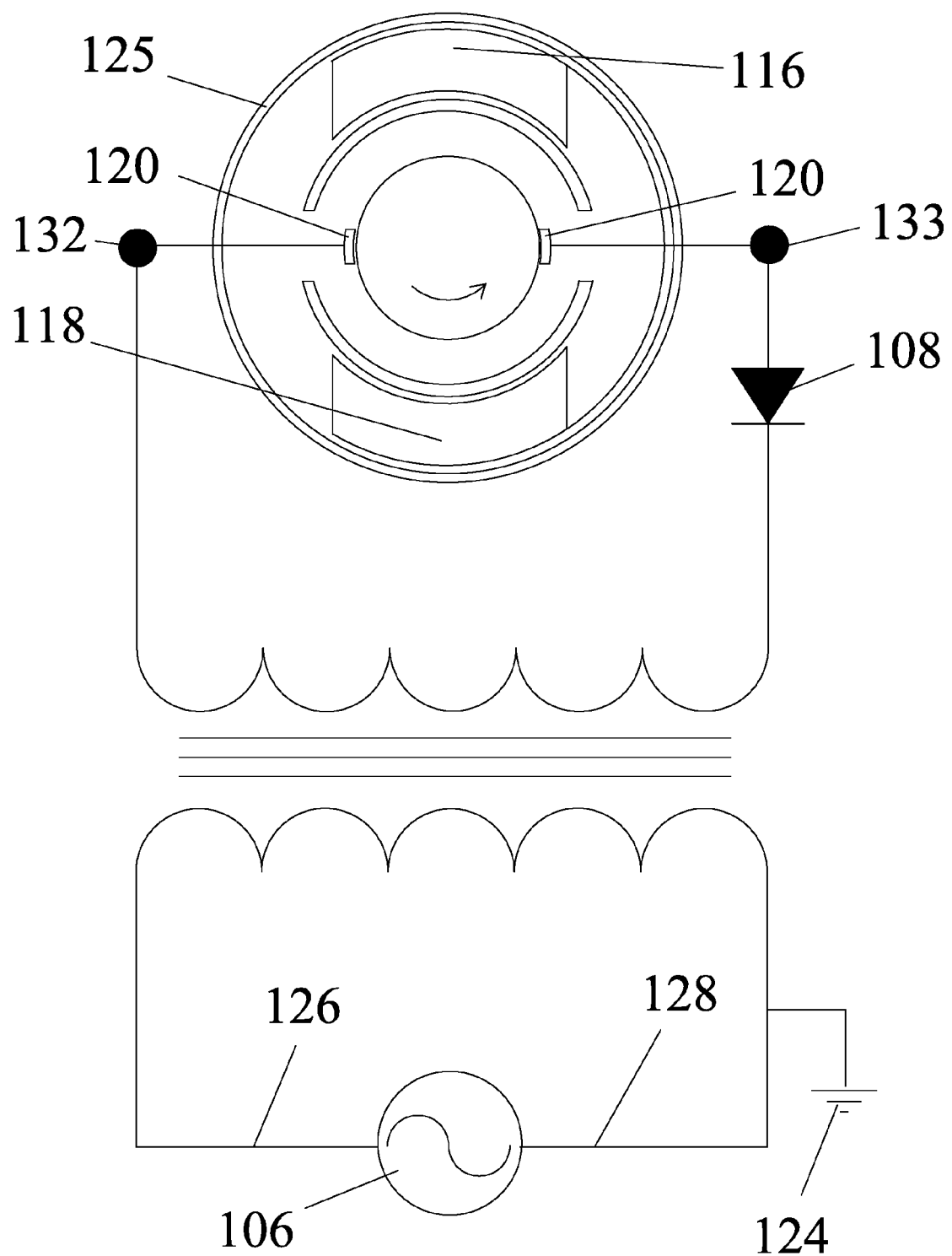
FIG. 5 is a diagram of a PMDC motor interfaced with an AC grid.
Figure 6A:
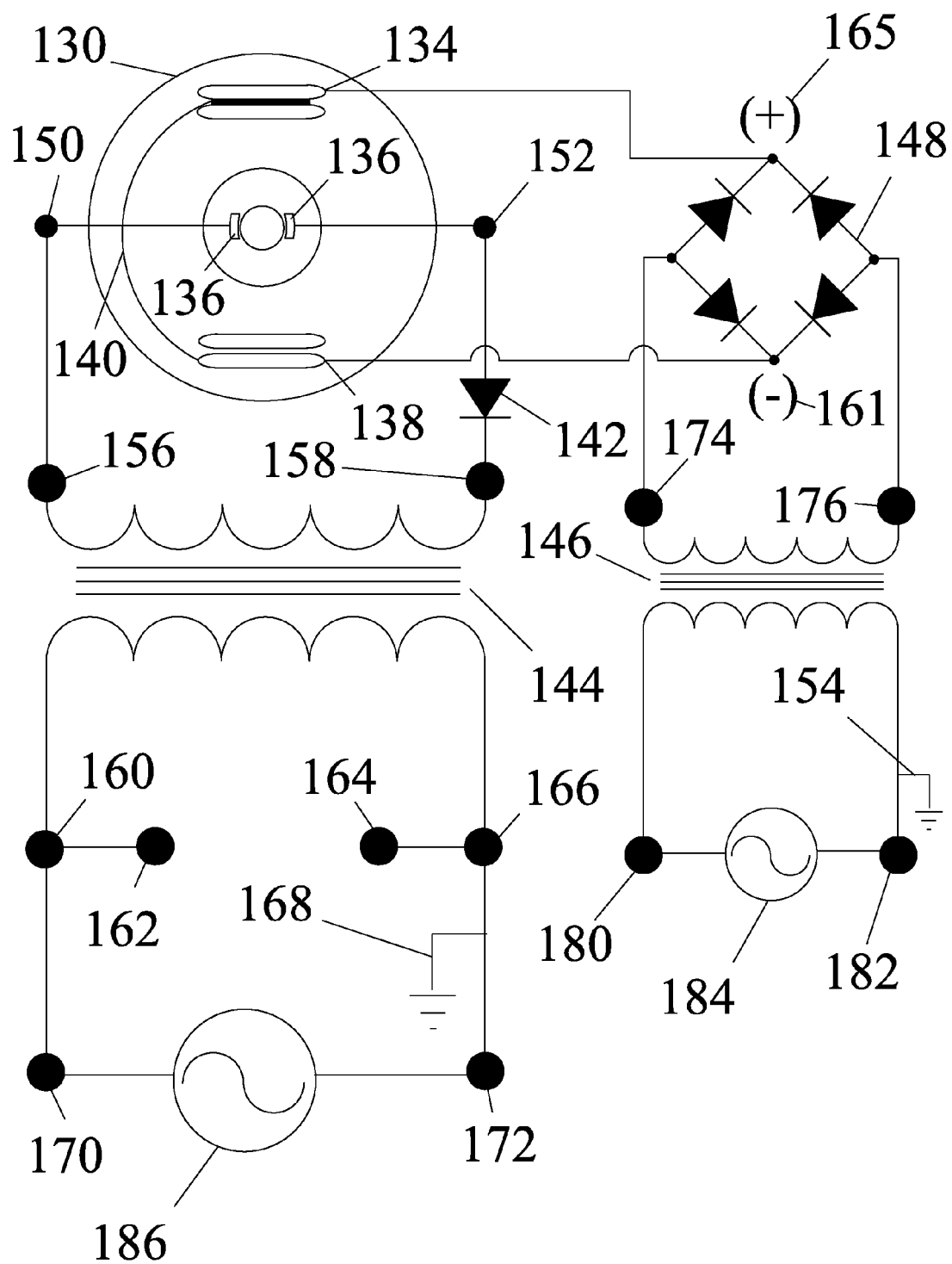
FIG. 6A is a diagram of a shunt, compound, series or other wound DC motor embodiments interfaced with the AC grid.

Referring to FIGS. 5A and 5B, a diagram of a PMDC motor interface with AC grid is shown having a North stator polarity 116 and South stator polarity 118. Diode 108 is shown connected to a neutral conductor 133 of PMDC motor 125 and electrically connected to a brush 120 (or brushless grid to armature interface). Motor 125 is adapted to rotate counter-clockwise as shown in the diagram. A hot leg 132 is shown in electrical contact with brush 120. An AC power source and AC load (motor and generator) 106 is an AC bi-directionally permitted hot conductor and a bi-directionally blocked (backfeed prohibited) grounded neutral conductor, which is grounded with ground 124. The system shown in FIG. 5B has an additional bridge rectifier 148 connected between motor Now referring to FIG. 6A, a shunt, compound, series or other wound DC motor embodiment is shown having a motor and generator housing 130 with a field coil F2 134 and another field coil F1 138. A series connection wire 140 is connected between F1 134 and F2 138. A pair of brushes 136 (or brushless grid to armature interface is connected to a positive neutral conductor 152 and a negative hot leg conductor 150. A power rectifier diode 142 is electrically connected to H1 158 with negative hot leg conductor 150 in electrical contact with H1 156.

Field coil F2 134 is electrically connected to a bridge rectifier 148 and to H2 176. Bridge rectifier 148 is also in electrical contact with H1 174. A transformer core 146 is provided to inductively connect to a grounded neutral conductor 182 and ground 154 and with AC hot 180 of an AC source and AC load 184.

H1 and H2 are inductively connected to L1 AC bi-directional conductor wire connection to electric power source and electric power load 170 and L2 AC bi-directional grounded neutral conductor wire connection to electric power source and electric power load 172. A ground 168 grounds L2 172. An AC load/source conductor connection option 162 and a grounded neutral conductor connection option 164 are provided. An AC power source and AC electric load 186 is provided as shown. A negative DC load/source terminal connection option 161 is shown on the DC motor side of diode and a positive DC load/source terminal connection option 165 is shown on the DC motor side of diode.

Figure 6B:
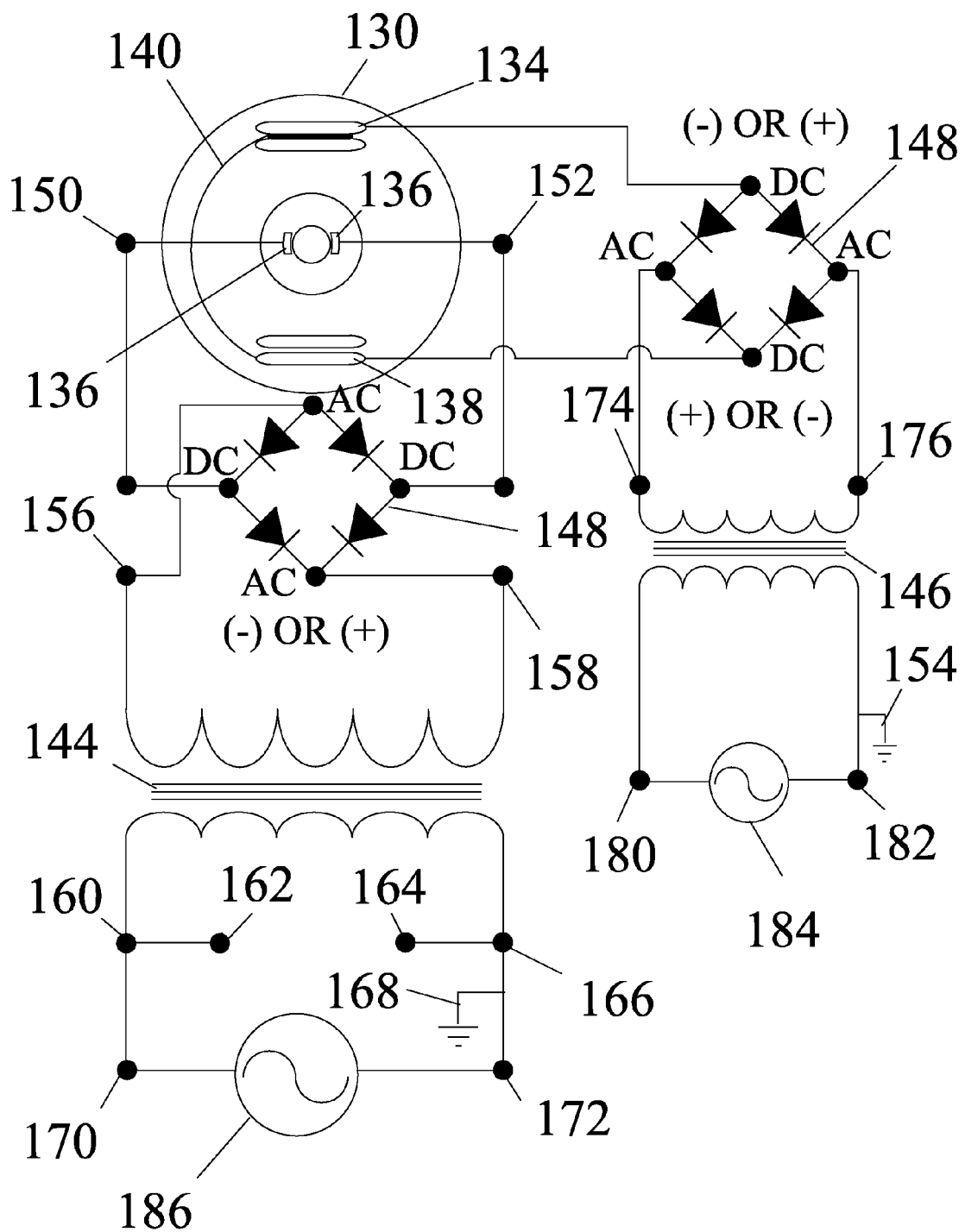
FIG. 6B is a diagram of another embodiment of a shunt, compound, series or other wound DC motor embodiments interfaced with the AC grid.

The embodiment shown in FIG. 6B includes an additional bridge rectifier 148 disposed between the motor/generator and transformer 144.

Figure 7:
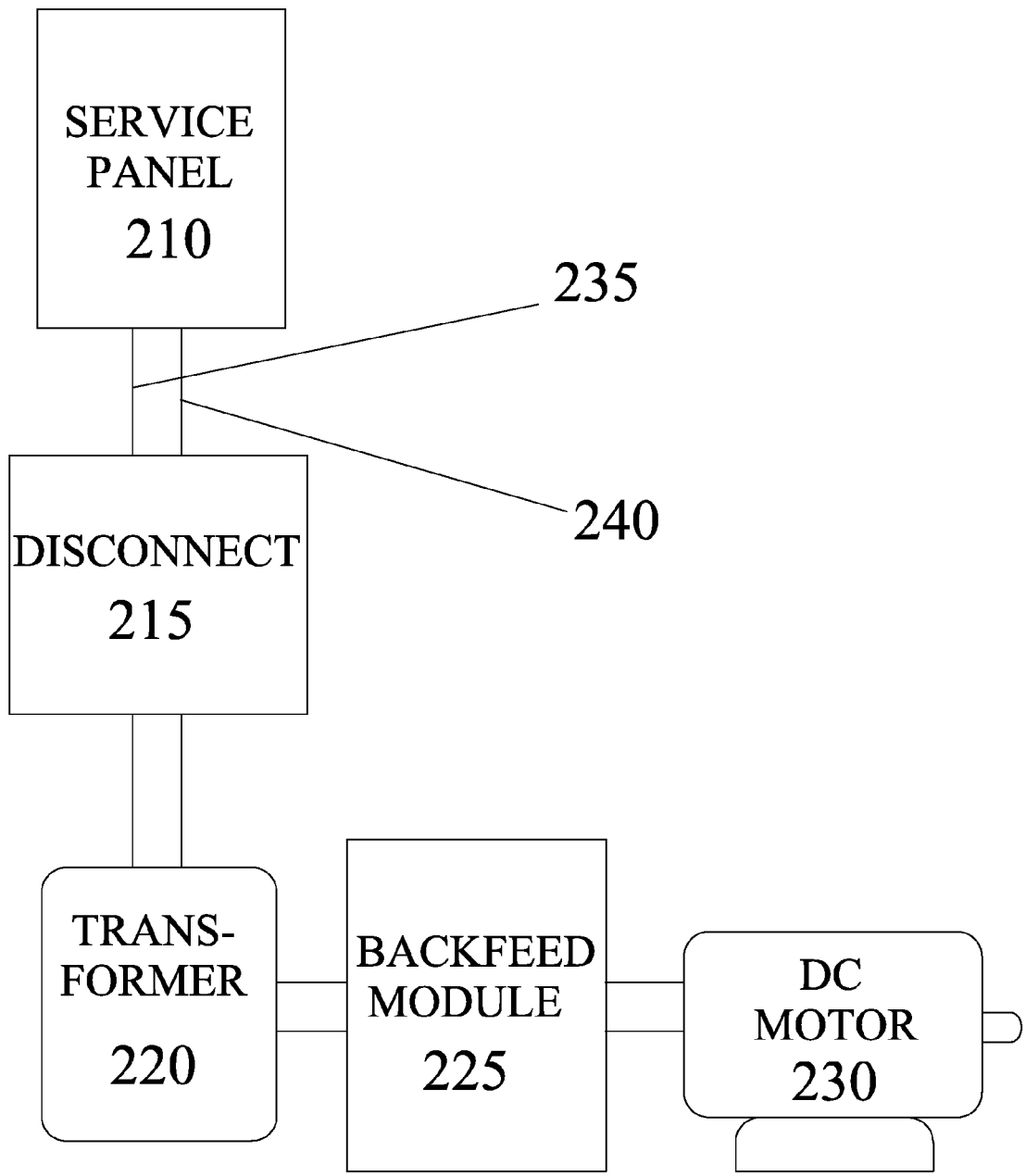
FIG. 7 is a system diagram of the electric power consumption neutralization, electric power generation and electric power backfeed effect.

Referring to FIG. 7, an energy saving, electric power consumption neutralizing, and AC/DC electricity generating auto energy harvesting basic system architecture is shown in a system diagram as having a un-detented, bi-directional watt/var/kva hour net metering alternative energy meter service panel 210 electrically connected with AC conductor 235 and a grounded neutral conductor 240 to a manual or automatic On/Off disconnect 215. A general purpose transformer 220 is also connected to disconnect 215 and an energy saving, electric power consumption neutralizing and electricity generating auto energy harvesting Pulse Gate action field and armature backfeed modules 225 and a DC motor 230

Figure 8:
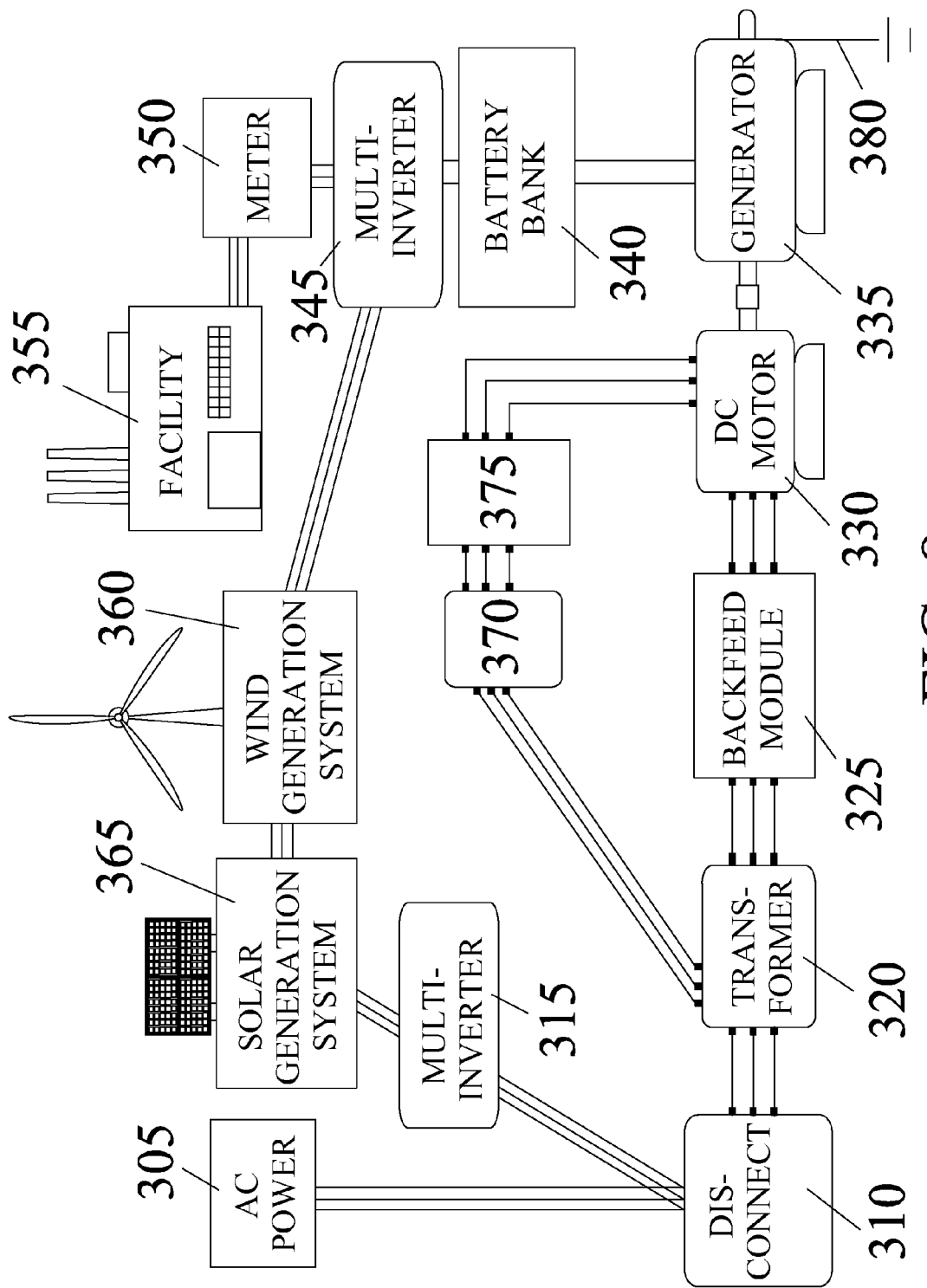
FIG. 8 is a system diagram of the instant invention applied to a hybrid commercial 1 phase or 3 phase grid configuration according to an embodiment of the present invention.

Now referring to FIG. 8, a system diagram of the instant invention applied to a hybrid commercial 1 phase or 3 phase grid tied wind, solar electric and an energy saving, electric power consumption neutralizing and electricity generating auto energy harvesting Pulse Gate enabled motor generator system is shown having an AC power source 305 which includes an electric power backfeed capturing net metering alternative energy meter and breakered service enclosure and is electrically connected to a manual or automatic On/Off disconnect 310 and then a transformer 320. An energy saving, electric power consumption neutralizing, electricity generating auto energy harvesting pulse gate armature backfeed module 325 is electrically connected to transformer 310 and a forward EMF backfeed generating DC drive motor 330 direct-drive or pulley coupled with a AC or DC, 1 phase or 3 phase generator depending on the application 335 which is grounded 380. Also connected to transformer 320 is another transformer 370 (if required) and electrically connected to the AC/DC motor field energy rectification module 375 which provides the static field energy to the DC drive motor field windings 330.

A solar power generation system 365 is electrically connected to on/off switch 310 and may have an optional multi-inverter 315. If desired, a wind electric power generation system 360 may be incorporated in the instant system and connected to a multi-inverter 345 and to an optional battery bank 340 which is connected to AC or DC 1 phase or 3 phase generator 335.

Additionally, a commercial or industrial facility 355 is electrically connected to an optional private micro utility owned 1 phase or 3 phase watt hour meter 350 to multi-inverter 354 and fed into the system as described above.

Figure 9:
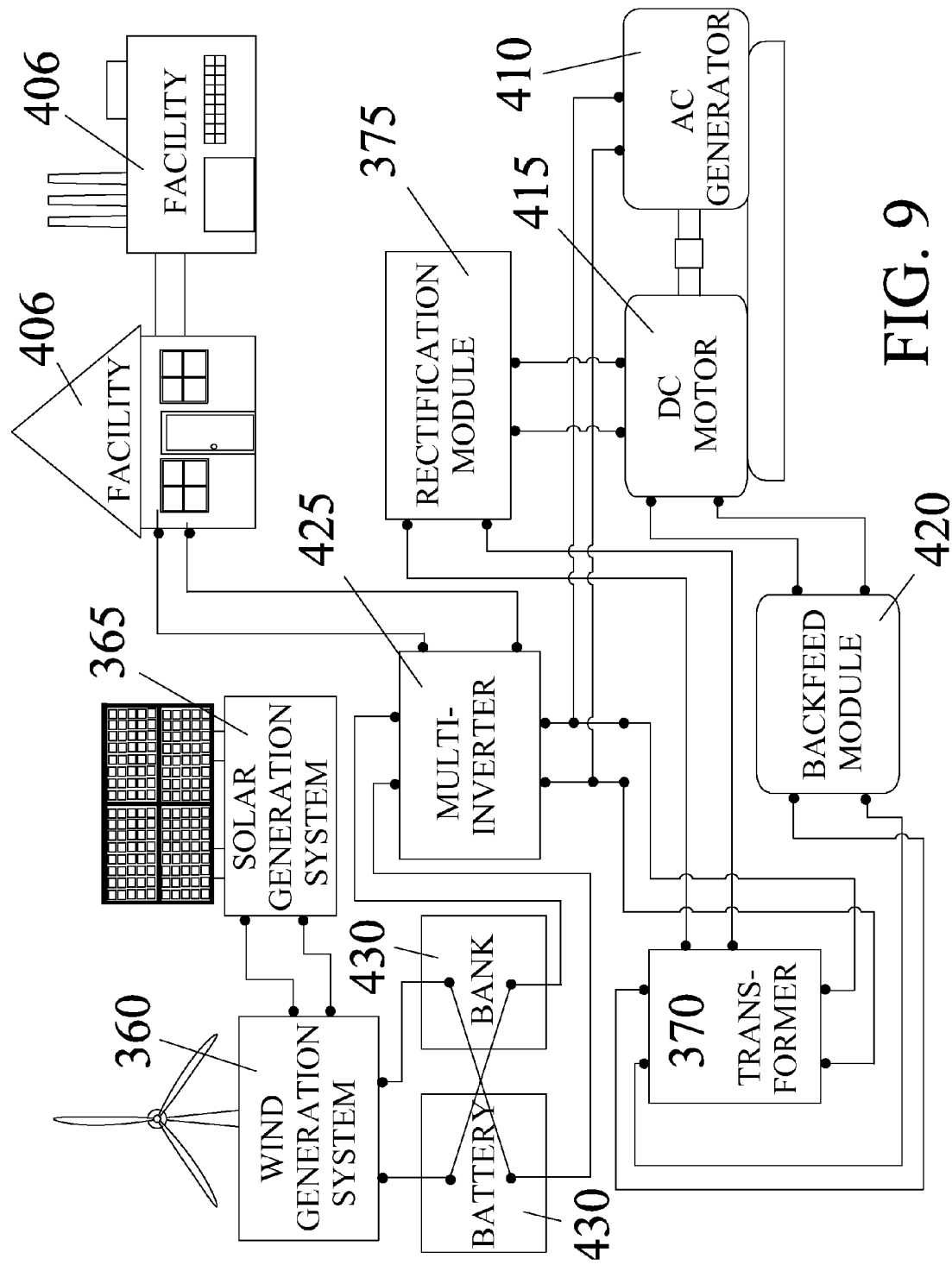
FIG. 9 is a system diagram of the instant invention applied to a hybrid residential or commercial, stand-alone 1 phase or 3 phase configuration according to an embodiment of the present invention.

Referring to FIG. 9, a system diagram of the instant invention applied to a hybrid residential stand-alone single phase wind, solar electric and electric power saving, electric power consumption neutralizing, and electricity generating auto energy harvesting motor generator system is shown with wind power generation system 360 and solar electric generation system 365 electrically connected to a battery bank 430, a multi-inverter 425, transformer (single or 3 phase) 370 an electric power saving, electric power consumption neutralizing, and electricity generating auto energy harvesting armature backfeed module 420, a forward EMF backfeed generating DC drive motor 415 and AC generator (single or 3 phase) 410. AC/DC motor field energy rectification module 375, which provides the static field energy to the DC drive motor field windings and feeds into forward EMF electricity backfeed generating DC drive motor 415 as discussed above.

Figure 10:
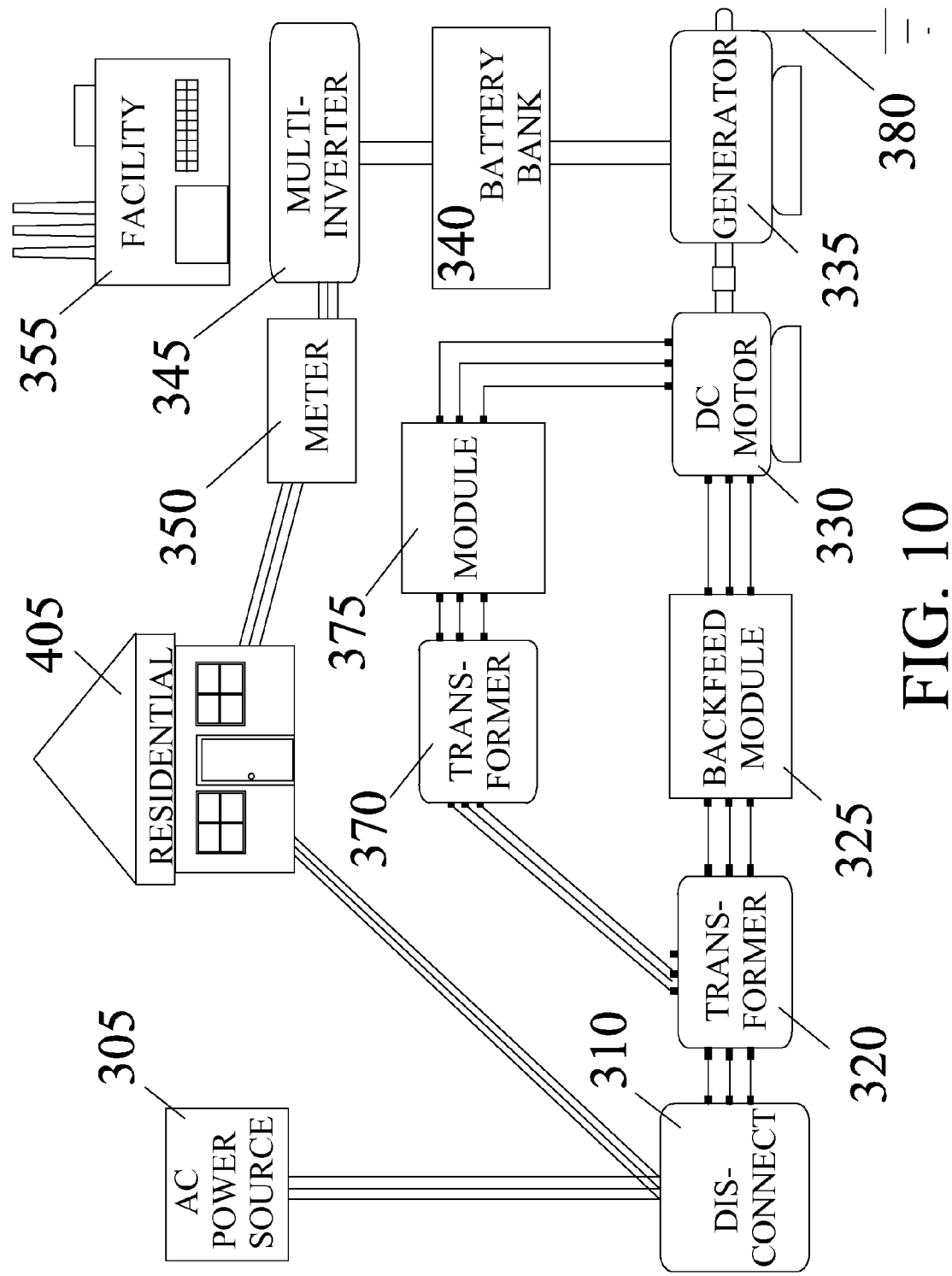
FIG. 10 is a system diagram of the instant invention applied to a residential or commercial grid tied non-solar and non-wind application according to an embodiment of the present invention.

Referring to FIG. 10, a system diagram of the instant invention is shown applied to a residential or commercial grid tied non-solar and non-wind application of the electric power saving, electric power consumption neutralizing and electricity generating AC/DC pulse action auto energy harvesting electric motor drive system, including the capture, and control apparatus to automatically recover and monetize the usable power and energy saved and produced by these system components according to an embodiment of the present invention. The remote stand-alone hybrid non-wind, non-solar and bi-directional electricity generating electric power generating system for reduced power consumption telecommunications power systems battery charging and simultaneous alternating current electric power generation is shown having an AC power source 305 electrically connected to a manual on/off switch 310. On/Off switch 310 is optional but recommended. A transformer 320 is energized and electrically connected to a power electronics cogeneration module 325 and another transformer 370. Transformer 370 is electrically connected to a field cogeneration module 375 which feeds into a co-generating DC drive motor 330.

Power electronics cogeneration module 325 also feeds into co-generating DC drive motor 330. Co-generating DC drive motor 330 is electrically connected to a DC generator (or AC alternator) 335 which is grounded using a ground 380. DC generator 335 is in electrical communication with a bi-directional inverter 345 which is connected to a breaker box 350 which is electrically connected to a residential home with energy control 405. An optional battery bank 340 may be used to provide additional functionality and efficiency. Additionally, although this is shown connected to residential home 405, this embodiment may be applied to other electrical consumers such as commercial or industrial applications 355.

Figure 11:
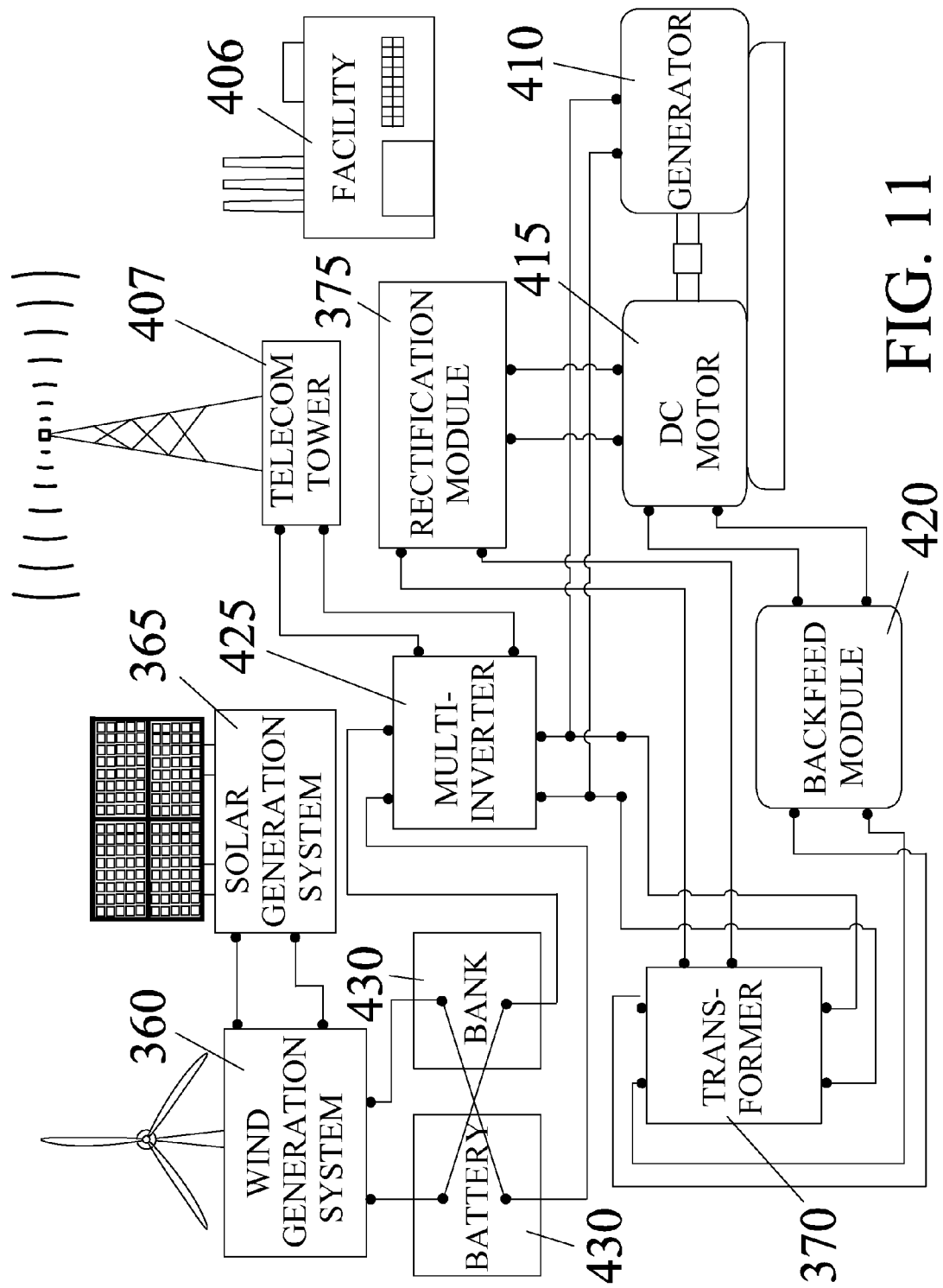
FIG. 11 is a system diagram of the instant invention applied to a stand-alone hybrid solar electric, wind or electric configuration according to an embodiment of the present invention.

FIG. 11 is system diagram a power saving, electric power consumption neutralizing and electricity generating AC/DC pulse action auto energy harvesting electric motor drive system, including the capture, storage, use and control apparatus to automatically recover and possibly to privately meter and monetize the usable power and energy saved and produced by these system components specifically for telecommunications, commercial, or other 1 phase or 3 phase non-grid tied specialty application embodiments.

As shown, a wind power generation system 360 and solar power generation system 365 is electrically connected to batteries 430 which are connected to a multi-inverter 425. A telecom tower (self-regulated) 407 is electrically connected to multi-inverter. The use of multi-inverter 425 is optional. A transformer 370 is electrically connected to a Hardison DC motor field module which is electrically connected to a forward EMF (backfeed) generating DC drive motor 415 and to a generator 410. Again, the system is applicable to grid tied, stand-alone residential, commercial or industrial facility electric load options 406.

Figure 12:
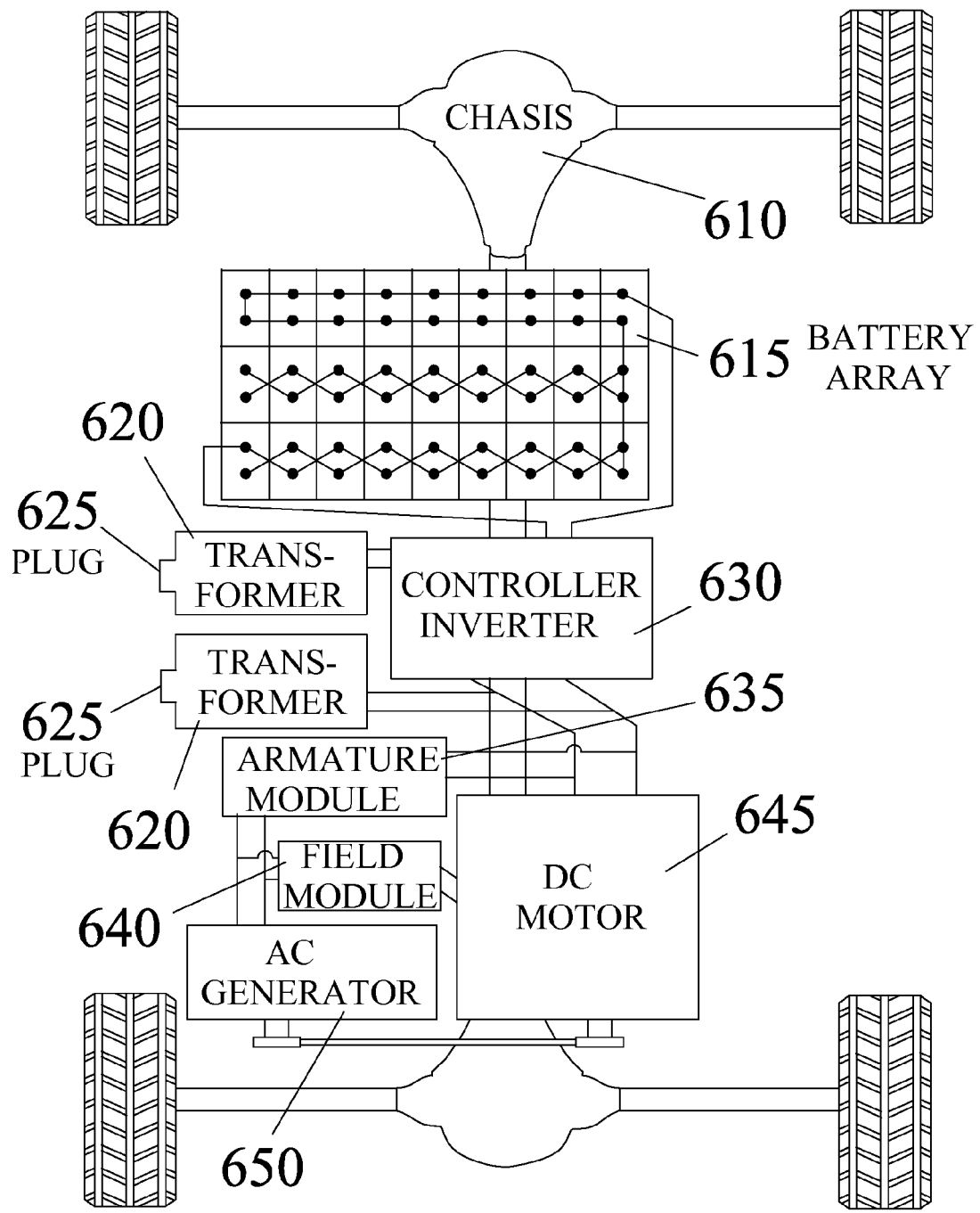
FIG. 12 is an illustration of a Pulse Gate technology controlled electric power saving, electric power consumption neutralizing system applied to a vehicle according to an embodiment of the present invention.

Referring now to FIG. 12, an automatic energy harvesting rechargeable total electric vehicle drive train is shown mounted on a vehicle chassis 610. A battery array 615 is mounted therein and in electrical communication with a charge controller inverter 630. Plugs 625 are used to provide recharging. Transformers 620 interface plugs 625 and charge controller inverter 630. A DC backfeed motor 645 is also connected to charge controller inverter 630. An armature module 635, field module 640 and 1 phase AC generator 650 completes the system where in the energy is recovered.

Figure 13:
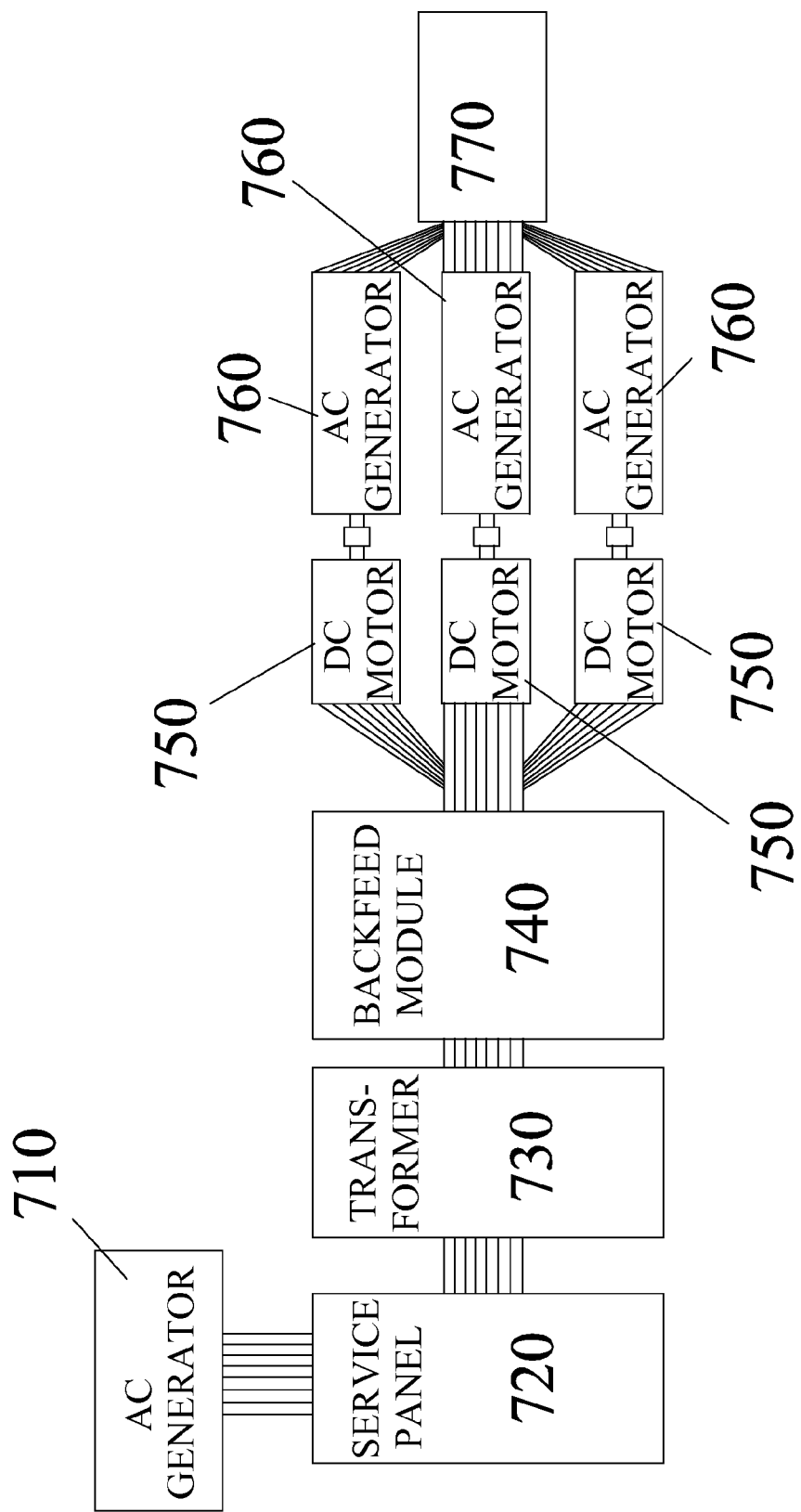
FIG. 13 is a system diagram showing a three phase AC/DC Pulse Gate technology enabled motor generator set layout with armature backfeed module and net metering capture and control features according to an embodiment of the present invention.

Now referring to FIG. 13, the system is shown with a three phase AC/DC Pulse Gate technology enabled motor generator set layout with armature backfeed module and net metering capture and control. A three phase AC generator 710 is connected to a three phase AC input/output power source/load 720 Watt hour meter service panel, three phase transformer 730, three phase pulse gate armature and field power rectifier module 740. A plurality of DC motors 750 and AC generators 760 are connected between three phase pulse gate armature and field power rectifier module 740 and a three phase AC input/output power source/load 770.

Figure 14:
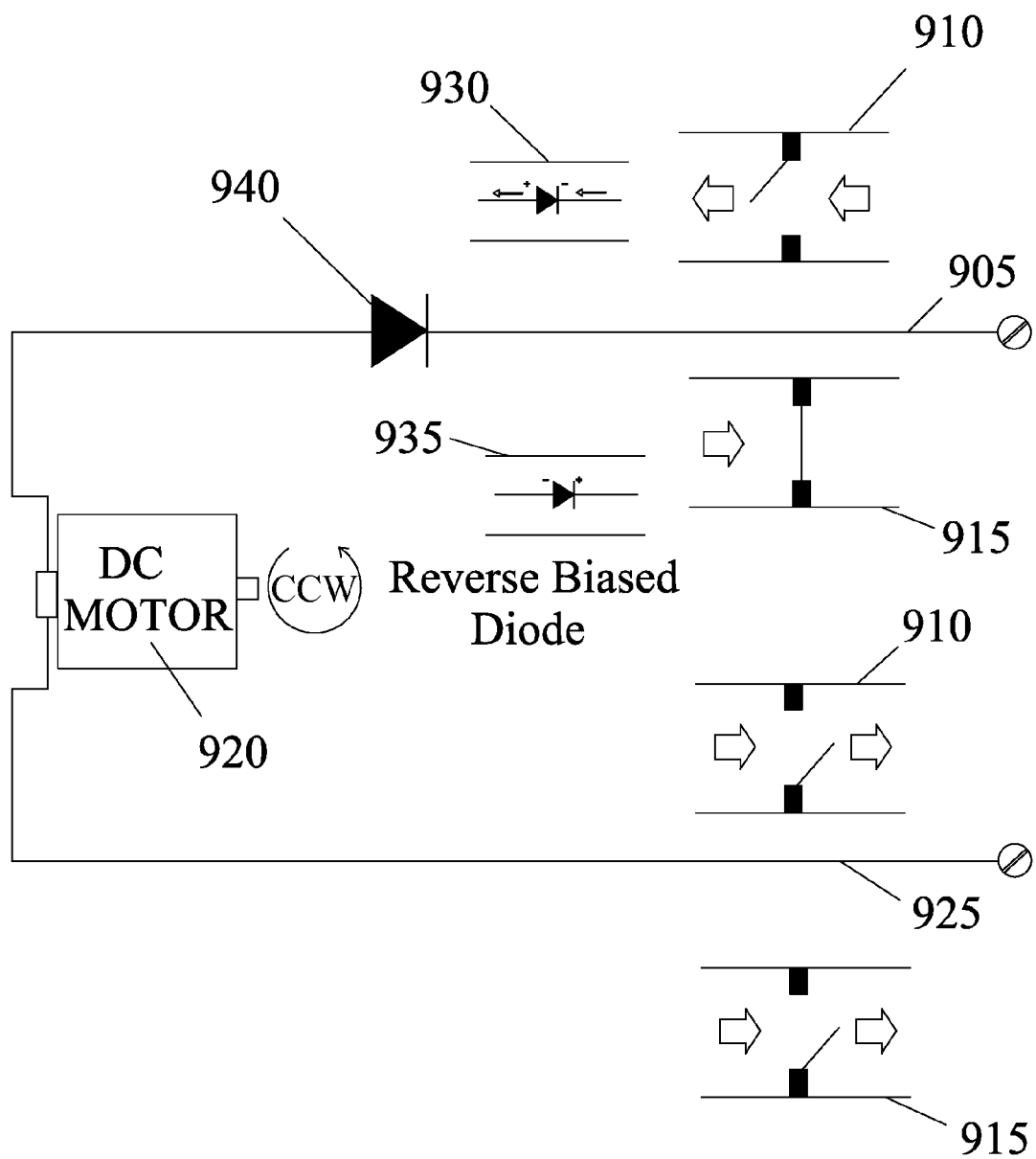
FIG. 14 is a circuit diagram of a bi-polar circuit with reversing gate control according to an embodiment of the present invention.

Referring now to FIG. 14, a circuit diagram of a bi-polar circuit with reversing gate control according to an embodiment of the present invention is shown having a DC motor 920 adapted to rotate counter-clockwise as shown. Hertz 1 910 is shown as well as Hertz 2 911. Theses currents represent the current states within the system with reverse biased diode 935 and diode 940.

Figure 15:
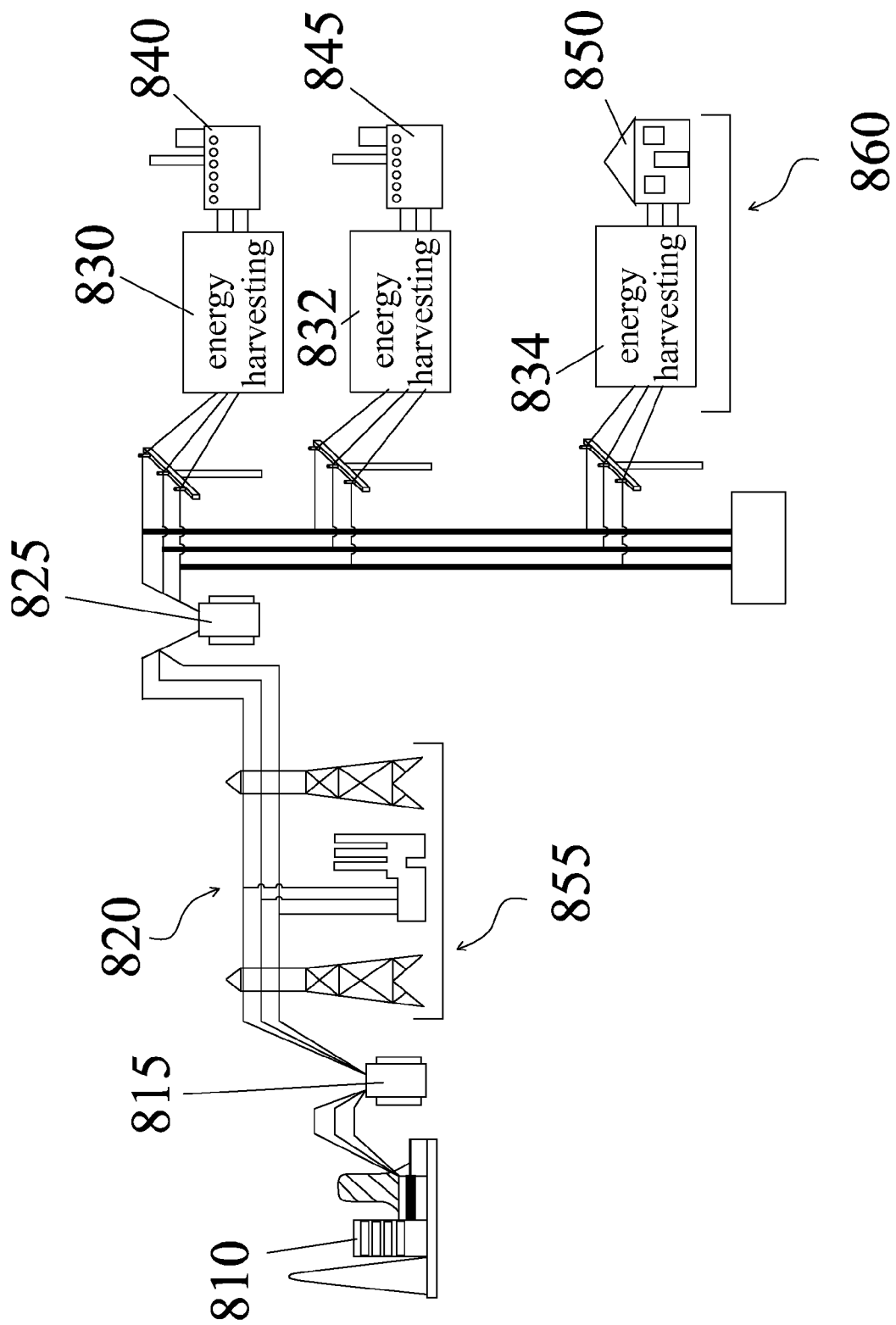
FIG. 15 is a system illustration of a power distribution grid application according to an embodiment of the invention.

Now referring to FIG. 15, a power distribution grid system is shown in a typical application with a generating station 810 transmitting power to a step up transformer 815 which is distributed over transmission lines 820 (transmission infrastructure 855) which is then fed to a substation step down transformer 825 and then fed to consumers using pulse gate technology enabled inductive reactive energy driven motor genset with auto energy harvesting and net metering 830, 832 and 834 which is fed to a subtransmission customer 840, primary customer 845 or secondary customer 850 or any combination thereof.

In general terms, generating station 810, step up transformer 815, transmission lines 820 and transmission infrastructure 855, station step down transformer 825, 20 kv Pulse Gate technology enabled Inductive reactive energy driven motor genset with auto energy harvesting and net metering 830, 13 kv Pulse Gate technology enabled Inductive reactive energy driven motor genset with auto energy harvesting and net metering 832, 120/240 v Pulse Gate technology enabled Inductive reactive energy driven motor genset with auto energy harvesting and net metering 834, Industrial primary customer 840, commercial secondary customer 845 and residential end user 850 allowing for capacitive reactance back feed through transmission infrastructure 855 and inductive reactive energy driven motor genset driven electric vehicle, home and grid charging system 860 according to the instant invention.

Figure 16:
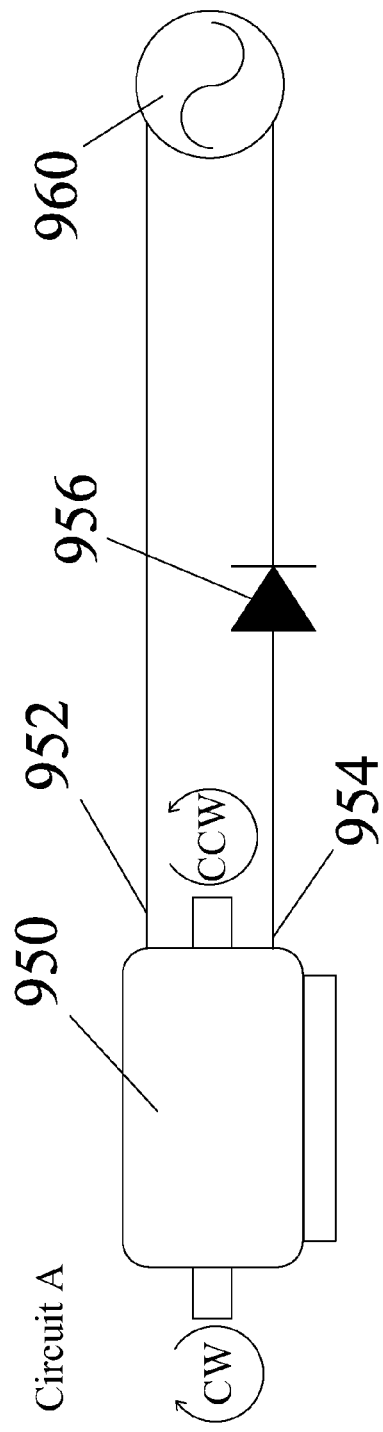
FIG. 16 is a basic circuit diagram as applied to AC/DC circuits according to an embodiment of the invention.

Referring to FIG. 16, circuit A is shown having an AC source and DC load 950 with a red GNC neutral conductor 952 an AC source and AC load 960. A diode 956 is in electrical connection with a black wire (negative) 954 completes the circuit. Circuit A must have its non-dioded red line connected to the grounded neutral conductor of the grid and must have its dioded line connected to the phase line of the grid with the anode of the diode facing toward the motor where the motor is rotating clock-wise at the drive end of the motor. The circuit will feed power back on the phase line only.

Figure 17:
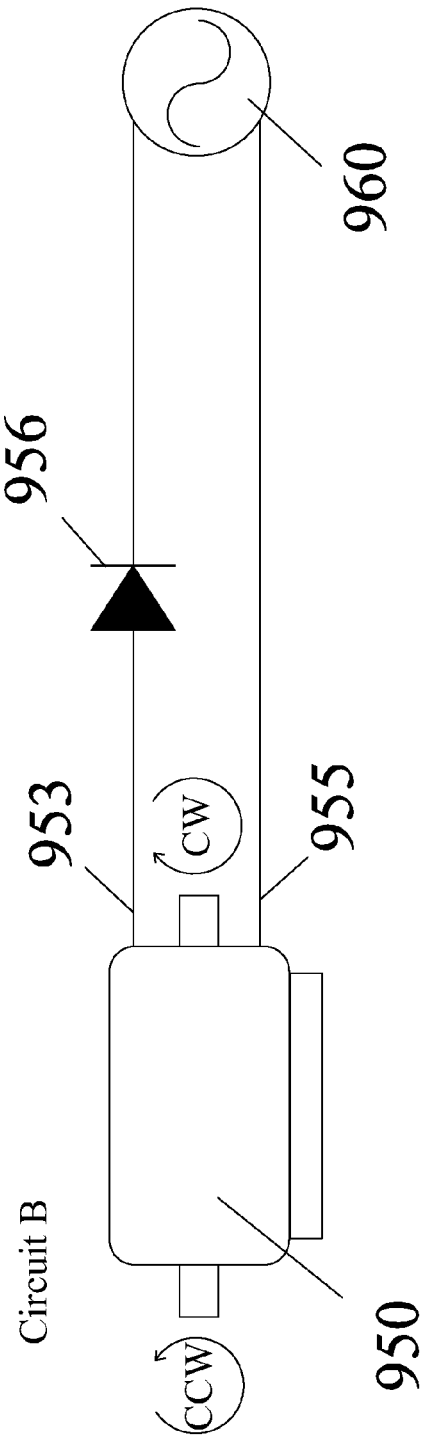
FIG. 17 is another basic circuit diagram as applied to AC/DC circuits according to an embodiment of the invention.

Referring now to FIG. 17, circuit B is shown having an AC source and DC load 950 with a red GNC neutral conductor 953 an AC source and AC load 960. A diode 956 is in electrical connection with red GNC neutral conductor 953 and a black conductor 955 completes the circuit. Circuit B must have its non-dioded black line connected to the phase line of the grid and must have its dioded line connected to the grounded neutral conductor with the cathode of the diode facing toward the motor where the motor is rotating counter clock-wise at the drive end of the motor. The circuit will feed power back on the phase line only.

Testing Data

Genset Specifications—MC Power 45 kva/36 kw 480 volt, 3 phase Diesel Genset Model No. DCA45SSIU3

Spec. fuel consumption—2.64 gallons per hour @ full load No load baseline fuel consumption results were 1.1 lbs. of fuel used during 30 minute pretest run.

Test scenario No. 1—Traditional Power supplied to typical inductive load, 130 minute diesel genset supplied electric power directly to 50 horsepower 460 volt 3 phase AC motor.

Line to Line voltage measured 475 volts per phase, the motor ran at 1818 rpm. 14,107.5 watts per phase (42,322 total input watts from the diesel generator.) The amp draw supplied to the motor load was 29.7 amps per phase. Beginning baseline fuel container weight for all tests conducted below was 6 lbs 14.2 oz. of fuel. The first run of this test ran for 30 minutes with an ending fuel weight of 4 lbs 10 oz. with a total net fuel consumed of 2 lbs 4.2 oz. The 3 phase AC motor electrical load of 42,322 total watts represented a 101.76% load on the 36,000 watt 45 kva generator. We got only one usable run on test scenario No. 1. The second run results were skewed by an accidental turning down of the voltage at the diesel generator output.

Ratio of total energy input to total energy output test No. 1
1 watt input=1 watt output Net excess watts produced continually=0 lbs of fuel used per hour 4.525

Net excess watts produced per pound of fuel per hour=0

Test scenario No. 2—Pulse Gate full wave embodiment, diesel genset supplied 273 volts line to neutral (26.7 amps were supplied to the transformer from the diesel generator for a total of 7,289.1 input watts.) The first run of this test ran for 30 minutes with an ending fuel weight of 5 lbs 0 oz. with a total net fuel consumed of 1 lb. 14.2 oz. The first run of this test ran for 30 minutes with an ending fuel weight of 5 lbs 0 oz. with a total net fuel consumed of 1 lb. 14.2 oz. to Pulse Gate motor genset via a step up transformer, utilizing only one of the three phases and the grounded neutral conductor working in concert with the full wave Pulse Gate electronics. The DC and AC motors both ran at between 1871 to 2010 rpm. I believe the first 30 minute run test results were not accurately measured. The 15 minute third run test had an ending fuel weight of 5 lbs 6.4 oz. with a total net fuel consumed of 1 lb 7.8 oz. The three phase AC motor electrical load of 18,670.5 total watts represented a 54.275% load on the 34,400 watt/43 kva Mecc Alte generator.

Ratio of total energy input to total energy output test No. 2
1 watt input=2.56 watt output Net excess watts produced continually=11,381.4 average pounds of fuel used per hour 4.8625

Net excess watts produced per pound of fuel per hour Net=2,340.6

Test scenario No. 3 Test—Pulse Gate half wave embodiment, diesel genset supplied 269 volts line to neutral (38.9 amps were supplied to the transformer from the diesel generator for a total of 10,464.1 input watts) to Pulse Gate motor genset via a step up transformer, utilizing only one of the three phases and the grounded neutral conductor working in concert with the half wave Pulse Gate electronics. The DC and AC motors both ran at 1979 rpm. The only usable test results we could use due to the accidental voltage turn down was the second half wave 30 minute test. The ending fuel weight was 4 lbs 7 oz. with a total net fuel consumed of 2 lbs 7 oz. The three phase AC motor electrical load of 12,589.2 represented a 36.59% load on the 34,400 watt/43 kva Mecc Alte generator.

Ratio of total energy input to total energy output test No. 3
1 watt input=1.203 watt output Net excess watts produced continually=2125.1 pounds of fuel used per hour 4.875

Net excess watts produced per pound of fuel per hour=435.92.

Below is a summary of the test results:
Drive motor type tested:
(1) Permanent magnet
(2) Direct current
(3) AC vent fan motor Power supply regulation method:
(1) Pulse gate electronics
(2) Applied to supply wires
(3) Design regulated

|  | RPM | Volts | Full load amps | Horsepower |
|---|---|---|---|---|
| (1) | 0-25K | 9-18 vdc | 1.5 | 0.0241 |
| (2) | variable | no results | no results | no results |
| (3) | 3K | 120/12 vac | 1.44 | 0.0232 |

|  | Transformer Spec. | Generator Spec. | Motor Generator Set Coupling System |
|---|---|---|---|
| (1) | 12/120 volt 60 hz, 5 A | 9-18 v pmdc 1.5 amp | direct coupled sleeve |
| (2) | no results | no results | no results |
| (3) | 12/120 volt 60 hz, 5 A | 9-18 v pmdc 1.5 amp | rubber pulley belt |

|  | Electrical Load | Battery Beginning State of Charge | Run Time to State of Exhaustion |
|---|---|---|---|
| (1) | 12 volt light Bulb, 200 ma | 13 volts | 5 minutes 54.5 secs. |
| (2) | no results | no results | no results |
| (3) | 12 volt light Bulb, 200 ma | 13 volts | 3 minutes 27.3 secs. |

SUMMARY OF TEST RESULTS (1) Ran 41% longer on a charge than the traditional AC equal
(2) No results
(3) Ran only 59% as long as the Pulse Gate System.

Although the instant invention has been described in relation to particular embodiments thereof, many other variations and modifications and other uses will become apparent to those skilled in the art.

What is claimed is:

1. An electric motor drive system capture and control apparatus for energy savings comprising:
    an alternating current power source;
    a direct current motor;
    a power rectifier diode rated for said alternating current power source and said direct current motor;
    said power rectifier diode electrically connected in a reverse bias mode between a negative supply wire of said direct current motor and a grounded neutral conductor of said alternating current power source; and
    a ground wire electrically connected to said direct current motor and cross connected to a hot lag wire of said alternating current power source; wherein said direct current motor is voltage matched to said alternating current power source.

2. The electric motor drive system capture and control apparatus for energy savings according to claim 1 further comprising a transformer electrically connected to said alternating current power source and said direct current motor wherein said direct current motor is voltage matched to said alternating current power source.

3. The electric motor drive system capture and control apparatus for energy savings according to claim 1 further comprising a bridge rectifier diode electrically connected to said direct current motor and said alternating current power source.

4. The electric motor drive system capture and control apparatus for energy savings according to claim 3 further comprising at least a second transformer electrically connected to said alternating current power source and said direct current motor wherein said direct current motor is voltage matched to said alternating current power source.

5. An electric motor drive system capture and control apparatus for energy savings comprising:
   an alternating current power source;
   a direct current motor;
   at least three power rectifier diode rated for said alternating current power source and said direct current motor;
   said at least three power rectifier diodes electrically connected in a reverse bias mode between a negative supply wire of said direct current motor and a grounded neutral conductor of said alternating current power source; and
   a ground wire electrically connected to said direct current motor and cross connected to a hot lag wire of said alternating current power source; wherein said direct current motor is voltage matched to said alternating current power source.

6. The electric motor drive system capture and control apparatus for energy savings according to claim 5 further comprising at least three transformers electrically connected to said alternating current power source and said direct current motor wherein said direct current motor is voltage matched to said alternating current power source.

7. A method of applying an electric motor drive system capture and control apparatus for energy savings to a power supplying grid comprising the steps of:
   electrically connecting an alternating current source to an electrical grid system;
   electrically connecting a direct current drive motor to said electrical grid system;
   obtaining an electric motor drive system capture and control apparatus for energy savings comprising;
   a power rectifier diode rated for said alternating current power source and said direct current motor;
   said power rectifier diode electrically connected in a reverse bias mode between a negative supply wire of said direct current motor and a grounded neutral conductor of said alternating current power source;
   a ground wire electrically connected to said direct current motor and cross connected to a hot lag wire of said alternating current power source;
   wherein said direct current motor is voltage matched to said alternating current power source; and
   electrically connecting said electric motor drive system capture and control apparatus for energy savings to said electrical grid wherein the efficiency of the usable electrical energy is improved.

8. The method of applying an electric motor drive system capture and control apparatus for energy savings to a power supplying grid according to claim 7 further comprising the step of electrically connecting said alternating current power source to an electrical shut off switch.

\* \* \* \* \*